(12) United States Patent
Kocienda et al.

(10) Patent No.: US 11,868,516 B2
(45) Date of Patent: Jan. 9, 2024

(54) HAND-SPECIFIC LASER PROJECTED VIRTUAL INTERFACES AND OPERATIONS

(71) Applicant: Humane, Inc., San Francisco, CA (US)

(72) Inventors: Kenneth Luke Kocienda, Mill Valley, CA (US); Imran A. Chaudhri, San Francisco, CA (US)

(73) Assignee: Humane, Inc., San Francisco, CA (US)

( * ) Notice: Subject to any disclaimer, the term of this patent is extended or adjusted under 35 U.S.C. 154(b) by 0 days.

(21) Appl. No.: 17/687,533

(22) Filed: Mar. 4, 2022

(65) Prior Publication Data

US 2023/0280822 A1 Sep. 7, 2023

(51) Int. Cl.
*G06F 3/01* (2006.01)
*G06V 40/10* (2022.01)
*G06F 3/0482* (2013.01)
*G06T 7/70* (2017.01)

(52) U.S. Cl.
CPC .............. *G06F 3/011* (2013.01); *G06F 3/017* (2013.01); *G06F 3/0482* (2013.01); *G06T 7/70* (2017.01); *G06V 40/107* (2022.01); *G06T 2207/30196* (2013.01); *G09G 2354/00* (2013.01)

(58) Field of Classification Search
CPC ........ G02B 27/017; G02B 1/163; G06F 3/011
See application file for complete search history.

(56) References Cited

U.S. PATENT DOCUMENTS

| 8,519,971 | B1 | 8/2013 | Mackraz | |
|---|---|---|---|---|
| 2010/0199232 | A1 | 8/2010 | Mistry et al. | |
| 2014/0055343 | A1* | 2/2014 | Kim | G06F 3/0304 345/156 |
| 2015/0208019 | A1* | 7/2015 | Stewart | G03B 21/26 348/745 |

(Continued)

FOREIGN PATENT DOCUMENTS

JP 2022-012070 1/2022

OTHER PUBLICATIONS

International Search Report and Written Opinion in International Appln. No. PCT/US2023/014380, dated Apr. 4, 2023, 7 pages.

(Continued)

*Primary Examiner* — Matthew A Eason
*Assistant Examiner* — Chayce R Bibbee
(74) *Attorney, Agent, or Firm* — Fish & Richardson P.C.

(57) ABSTRACT

Systems, methods, devices and non-transitory, computer-readable storage mediums are disclosed for a wearable multimedia device and cloud computing platform with an application ecosystem for processing multimedia data captured by the wearable multimedia device. In an embodiment, a wearable multimedia device obtains first configuration data specifying first operations associated with a first hand of a user of the wearable multimedia device, and second configuration data specifying second operations associated with a second hand of the user. Further, the device captures sensor data from a camera and/or a depth sensor of the wearable multimedia device, and determines a presence of (Continued)

the first hand and/or the second hand based on the sensor data. Further, the device performs at least one of (i) the first operations responsive to determining the presence of the first hand, or (ii) the second operations responsive to determining the presence of the second hand.

15 Claims, 15 Drawing Sheets

(56) References Cited

U.S. PATENT DOCUMENTS

| | | | |
|---|---|---|---|
| 2017/0123487 A1 | 5/2017 | Hazra et al. | |
| 2017/0269808 A1* | 9/2017 | Chang | G06F 3/0304 |
| 2019/0121522 A1 | 4/2019 | Davis et al. | |
| 2020/0111394 A1 | 4/2020 | Rakshit et al. | |
| 2021/0117680 A1 | 4/2021 | Chaudhri et al. | |

OTHER PUBLICATIONS

International Search Report and Written Opinion in International Appln. No. PCT/US2023/014498, dated Mar. 29, 2023, 8 pages.

Kanel, "Sixth Sense Technology," Thesis for the Bachelor Degree of Engineering in Information and Technology, Centria Univeristy of Applied Sciences, May 2014, 46 pages.

Mann et al., "Telepointer: Hands-Free Completely Self Contained Wearable Visual Augmented Reality without Headwear and without any Infrastructural Reliance", IEEE Fourth International Symposium on Wearable Computers, Atlanta, GA, USA, Oct. 16-17, 2000, 4 pages.

Mann, "Wearable Computing: A First Step Toward Personal Imaging," IEEE Computer, Feb. 1997, 30(2):25-32.

Mann, "Wearable, tetherless computer-mediated reality," American Association of Artificial Intelligence Technical Report, Feb. 1996, 62-69, 8 pages.

Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.

Mistry et al., "WUW—wear Ur world: a wearable gestural interface," Proceedings of the 27th international conference Extended Abstracts on Human Factors in Computing Systems—CHI EA '09, Boston, MA, USA, Apr. 4-9, 2009, 6 pages.

Shetty et al., "Sixth Sense Technology," International Journal of Science and Research, Dec. 2014, 3(12):1068-1073.

* cited by examiner

| Streams | Users | Userdevices | Devices |
|---|---|---|---|
| streamid<br>deviceid<br>start<br>end<br>lat<br>lon<br>attributes<br>entities | userid<br>deviceid<br>email<br>fname<br>lname | userid<br>deviceid | deviceid<br>started<br>state<br>modified<br>created |

| ProcessingResults | Entities | EntityTypes | EntityAssociations |
|---|---|---|---|
| streamid<br>ai<br>result<br>callback<br>duration<br>accuracy | entityID<br>userid<br>entityName<br>entityType<br>entityAttribute | person<br>place<br>thing<br>event | entity 1<br>entity 2 |

FIG. 5

HAND-SPECIFIC LASER PROJECTED VIRTUAL INTERFACES AND OPERATIONS

TECHNICAL FIELD

This disclosure relates generally to laser projected virtual interfaces.

BACKGROUND

High-precision laser scanners (e.g., MEMS scanners) have been developed that can turn any surface into a virtual interface (VI). For example, a laser projected VI can be projected onto the palm of a user's hand or other surface. Three-dimensional (3D) depth sensors (e.g., a time of flight (TOF) camera) can be used to detect user gestures that are interacting with one or more VI elements projected on the surface. In the case of the user's palm, there is very little surface area in which to project a detailed VI. This limited space can limit the number and types of user interactions with the VI, and thus potentially limit the number and types of applications that rely on the VI for input and output.

SUMMARY

Systems, methods, devices and non-transitory, computer-readable storage mediums are disclosed for a laser projected VI.

In general, a wearable multimedia device can include a projector subsystem configured to present information visually to a user in the form of projected light. For example, the projector subsystem can project light onto a surface (e.g., a surface of a user's hand, such as the user's palm) according to a particular spatial and/or temporal pattern, such that the user perceives a VI with one or more user interface elements. Further, the user can perform gestures to interact with the VI.

In some implementations, a wearable multimedia device can detect the hand that is presented by the user (e.g., in a projection area of the projector subsystem), and perform different operations depending on which hand has been presented. As an example, upon detecting that the user's left hand is positioned in the projection area of the projector subsystem, the wearable multimedia device can execute one or more first applications, present one or more first VIs on the surface of the user's left hand, and/or perform one or more first functions or tasks. As another example, upon detecting that the user's right hand is positioned in the projection area of the projector subsystem, the wearable multimedia device can execute one or more second applications, present one or more second VIs on the surface of the user's right hand, and/or perform one or more second functions or tasks.

In some implementations, the user can configure the operations that are associated with each hand. For example, the user can specify that the wearable multimedia device present a specific VI, execute a specific application, and/or perform a specific function or task when one of the user's hands is positioned in a projection area of the projector subsystem (e.g., such that the same "default" operation is performed by the wearable multimedia device each time the user positions that hand in the projection area of the projector subsystem). Further, the user can specify that the wearable multimedia device present other VIs, execute other applications, and/or perform other functions or tasks when the user's other hand is positioned in a projection area of the projector subsystem (e.g., such that the user can access other functionality of the wearable multimedia device by positioning her other hand in the projection area of the projector subsystem).

The implementations described herein can provide various technical benefits. For instance, these techniques allow the user to associate certain functions of the wearable multimedia device with each hand, such that she can interact with the wearable multimedia device in a more organized, consistent, predictable, and/or intuitive manner. Accordingly, the user can interact with the wearable multimedia device more quickly and efficiently, and is less likely to provide erroneous and/or unintended inputs to the wearable multimedia device.

Further, by reducing the occurrence of erroneous and/or unintended inputs by the user, these techniques can reduce the resources expended by the wearable multimedia device during operation. For instance, if a user has difficulty finding a particular option in a user interface, she may spend more time interacting with the wearable multimedia device to access the desired functionality. Further, if the user provides erroneous and/or unintended inputs, she may provide further inputs in an attempt to correct or reverse her actions. Accordingly, the wearable multimedia device may expend resources—such as computational resources (e.g., CPU cycles), memory resources, storage resources, network resources, and/or battery resources—that might otherwise not need to be expended. By reducing the likelihood of user error, the wearable multimedia device can reduce the expenditure of resources in correcting or reversing those errors. Thus, the wearable multimedia device can operate in a more efficient manner.

In an embodiment, a method includes: obtaining, by a wearable multimedia device: first configuration data specifying one or more first operations associated with a first hand of a user of the wearable multimedia device, and second configuration data specifying one or more second operations associated with a second hand of the user; capturing, by the wearable multimedia device, sensor data from at least one of a camera or a depth sensor of the wearable multimedia device; determining, by the wearable multimedia device, based on the sensor data, a presence of at least one of the first hand or the second hand; and at least one of: (i) performing, by the wearable multimedia device, the one or more first operations responsive to determining the presence of the first hand, or (ii) performing, by the wearable multimedia device, the one or more second operations responsive to determining the presence of the second hand.

Embodiments can include one or more of the following features.

In some embodiments, the one or more first operations can include projecting, using a laser projector of the wearable multimedia device, a first virtual interface (VI) on a first surface.

In some embodiments, the one or more second operations can include projecting, using the laser projector, a second VI on a second surface, where the first VI is different from the second VI.

In some embodiments, the first surface can be a surface of the first hand, and the second surface can be a surface of the second hand.

In some embodiments, the first surface can be a palm of the first hand, and the second surface can be a palm of the second hand.

In some embodiments, the one or more first operations can include execution of a first application, and the one or more second operations can include execution of a second application different from the first application.

In some embodiments, the first application can be selected from a first set of applications, and the second application can be selected from a second set of applications different from the first set of applications.

In some embodiments, the first configuration data can specify a first application associated with the first hand of the user. Further, performing at least some of the one or more first operations can include executing the first application.

In some embodiments, the first application can be selected by the user prior to the user presenting at least one of the first hand or the second hand to the wearable multimedia device.

In some embodiments, the second configuration data can specify a plurality of second applications associated with the second hand of the user. Further, performing at least some of the one or more second operations can include receiving an input from the user selecting a particular second application from the plurality of second applications, and executing the selected second application.

In some embodiments, receiving the input from the user can include determining, based on the sensor data, a physical gesture performed by the user; and determining that the gesture is associated with the selected second application.

In some embodiments, determining the presence of at least one of the first hand or the second hand can include determining that at least one of the first hand or the second hand is in a field of view of at least one of the camera or the depth sensor.

In some embodiments, the one or more first operations can include execution of one of: a note taking application, a calendar application, a messaging application, or a map application. Further, the one or more second operations can include execution of another one of: the note taking application, the calendar application, the messaging application, or the map application.

In some embodiments, the method can further include: determining, by the wearable multimedia device, based on the sensor data, an orientation of at least one of the first hand or the second hand, and at least one of: (i) performing, by the wearable multimedia device, the one or more first operations further responsive to determining the orientation of the first hand, or (ii) performing, by the wearable multimedia device, the one or more second operations further responsive to determining the orientation of the second hand.

In some embodiments, the method can further include: determining, by the wearable multimedia device, based on the sensor data, that one or more fingers are pointing outward from at least one of the first hand or the second hand, and at least one of: (i) performing, by the wearable multimedia device, the one or more first operations further responsive to determining that one or more fingers are pointing outward from the first hand, or (ii) performing, by the wearable multimedia device, the one or more second operations further responsive to determining that one or more fingers are pointing outward from the second hand.

In at least some embodiments, a wearable multimedia device includes: at least one processor; and memory storing instructions that, when executed by the at least one processor, cause the at least one processor to perform various operations, including one or more of the methods described herein.

In at least some embodiments, one or more non-transitory computer-readable media store instructions that, when executed by at least one processor, cause the at least one processor to perform operations, including one or more of the methods described herein.

The details of the disclosed embodiments are set forth in the accompanying drawings and the description below.

Other features, objects and advantages are apparent from the description, drawings and claims.

DESCRIPTION OF DRAWINGS

FIG. 5 illustrates data objects used by the data processing system of FIG. 2, according to an embodiment.

The same reference symbol used in various drawings indicates like elements.

DETAILED DESCRIPTION

Example Wearable Multimedia Device

Figure 1:
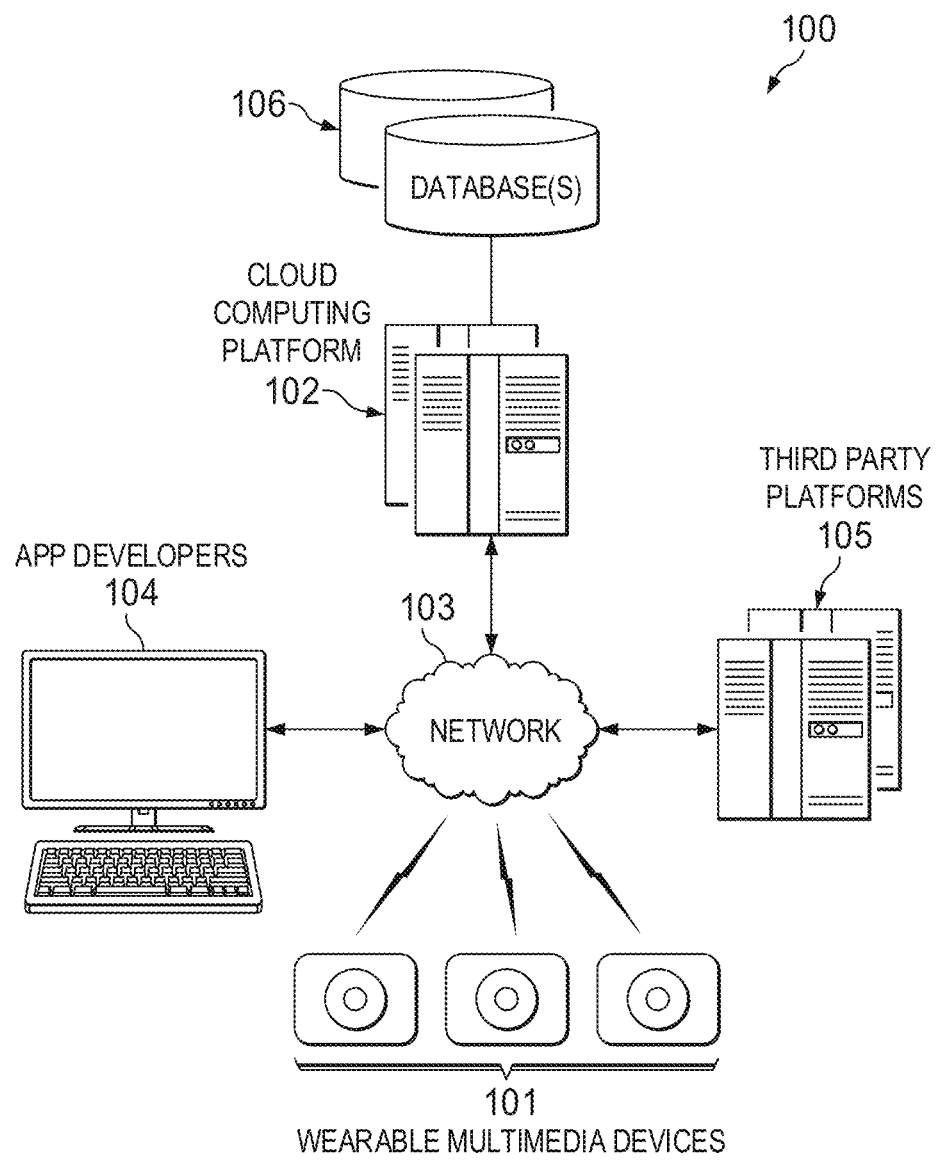
FIG. 1 is a block diagram of an operating environment for a wearable multimedia device and cloud computing platform with an application ecosystem for processing multimedia data captured by the wearable multimedia device, according to an embodiment

The features and processes described herein can be implemented on a wearable multimedia device. In an embodiment, the wearable multimedia device is a lightweight, small form factor, battery-powered device that can be attached to a user's clothing or an object using a tension clasp, interlocking pin back, magnet, or any other attachment mechanism. The wearable multimedia device includes a digital image capture device (e.g., a camera with a 180° FOV with optical image stabilizer (OIS)) that allows a user to spontaneously and/or continuously capture multimedia data (e.g., video, audio, depth data, biometric data) of life events ("moments") and document transactions (e.g., financial transactions) with minimal user interaction or device set-up. The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In an embodiment, the context data is processed by server computer(s) of the cloud computing platform based on user preferences. For example, images can be color graded, stabilized and cropped perfectly to the moment the user wants to relive based on the user preferences. The user preferences can be stored in a user profile created by the user through an online account accessible through a website or portal, or the user preferences can be learned by the platform over time (e.g., using machine learning). In an embodiment, the cloud computing platform is a scalable distributed computing environment. For example, the cloud computing platform can be a distributed streaming platform (e.g., Apache Kafka™) with real-time streaming data pipelines and streaming applications that transform or react to streams of data.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes).

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including WiFi, 3G, 4G and 5G communication technologies. In an embodiment, the headset or earbuds also include sensors (e.g., biometric sensors, inertial sensors) that provide information about the direction the user is facing, to provide commands with head gestures or playback of spatial audio, etc. In an embodiment, the camera direction can be controlled by the head gestures, such that the camera view follows the user's view direction. In an embodiment, the wearable multimedia device can be embedded in or attached to the user's glasses.

In an embodiment, the wearable multimedia device includes a projector (e.g., a laser projector, LCoS, DLP, LCD), or can be wired or wirelessly coupled to an external projector, that allows the user to replay a moment on a surface such as a wall or table top or on a surface of the user's hand (e.g., the user's palm). In another embodiment, the wearable multimedia device includes an output port that can connect to a projector or other output device.

In an embodiment, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured, optionally cropped (e.g., to protect privacy), and sent to the cloud computing platform where an image recognition application can run an image query and store or return the results to the user. Air and touch gestures can also be performed on a projected ephemeral display, for example, responding to user interface elements projected on a surface.

In an embodiment, the context data can be encrypted on the device and on the cloud computing platform so that only the user or any authorized viewer can relive the moment on a connected screen (e.g., smartphone, computer, television, etc.) or as a projection on a surface. An example architecture for the wearable multimedia device is described in reference to FIG. 8.

In addition to personal life events, the wearable multimedia device simplifies the capture of financial transactions that are currently handled by smartphones. The capture of every day transactions (e.g., business transactions, micro transactions) is made simpler, faster and more fluid by using sight assisted contextual awareness provided by the wearable multimedia device. For example, when the user engages in a financial transaction (e.g., making a purchase), the wearable multimedia device will generate data memorializing the financial transaction, including a date, time, amount, digital images or video of the parties, audio (e.g., user commentary describing the transaction) and environment data (e.g., location data). The data can be included in a multimedia data stream sent to the cloud computing platform, where it can be stored online and/or processed by one or more financial applications (e.g., financial management, accounting, budget, tax preparation, inventory, etc.).

In an embodiment, the cloud computing platform provides graphical user interfaces on a website or portal that allow various third party application developers to upload, update and manage their applications in an application ecosystem. Some example applications can include but are not limited to: personal live broadcasting (e.g., Instagram™ Life, Snapchat™), senior monitoring (e.g., to ensure that a loved one has taken their medicine), memory recall (e.g., showing a child's soccer game from last week) and personal guide (e.g., AI enabled personal guide that knows the location of the user and guides the user to perform an action).

In an embodiment, the wearable multimedia device includes one or more microphones and a headset. In some embodiments, the headset wire includes the microphone. In an embodiment, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

In an embodiment, the device can include photovoltaic surface technology to sustain battery life and inductive charging circuitry (e.g., Qi) to allow for inductive charging on charge mats and wireless over-the-air (OTA) charging.

In an embodiment, the wearable multimedia device is configured to magnetically couple or mate with a rechargeable portable battery pack. The portable battery pack includes a mating surface that has permanent magnet (e.g., N pole) disposed thereon, and the wearable multimedia device has a corresponding mating surface that has permanent magnet (e.g., S pole) disposed thereon. Any number of permanent magnets having any desired shape or size can be arranged in any desired pattern on the mating surfaces.

The permanent magnets hold portable battery pack and wearable multimedia device together in a mated configuration with clothing (e.g., a user's shirt) therebetween. In an embodiment, the portable battery pack and wearable multimedia device have the same mating surface dimensions, such that there is no overhanging portions when in a mated configuration. A user magnetically fastens the wearable multimedia device to their clothing by placing the portable battery pack underneath their clothing and placing the wearable multimedia device on top of portable battery pack outside their clothing, such that permanent magnets attract each other through the clothing.

In an embodiment, the portable battery pack has a built-in wireless power transmitter which is used to wirelessly power the wearable multimedia device while in the mated configuration using the principle of resonant inductive coupling. In an embodiment, the wearable multimedia device includes a built-in wireless power receiver which is used to receive power from the portable battery pack while in the mated configuration.

System Overview

FIG. 1 is a block diagram of an operating environment for a wearable multimedia device and cloud computing platform with an application ecosystem for processing multimedia data captured by the wearable multimedia device, according to an embodiment. Operating environment 100 includes wearable multimedia devices 101, cloud computing platform 102, network 103, application ("app") developers 104 and third party platforms 105. Cloud computing platform 102 is coupled to one or more databases 106 for storing context data uploaded by wearable multimedia devices 101.

As previously described, wearable multimedia devices 101 are lightweight, small form factor, battery-powered devices that can be attached to a user's clothing or an object using a tension clasp, interlocking pin back, magnet or any other attachment mechanism. Wearable multimedia devices 101 include a digital image capture device (e.g., a camera with a 180° FOV and OIS) that allows a user to spontaneously capture multimedia data (e.g., video, audio, depth data) of "moments" and document every day transactions (e.g., financial transactions) with minimal user interaction or device set-up. The context data captured by wireless multimedia devices 101 are uploaded to cloud computing platform 102. Cloud computing platform 102 includes an application ecosystem that allows the context data to be processed, edited and formatted by one or more server side applications into any desired presentation format (e.g., single image, image stream, video clip, audio clip, multimedia presentation, images gallery) that can be downloaded and replayed on the wearable multimedia device and/or other playback device.

By way of example, at a child's birthday party a parent can clip the wearable multimedia device on their clothing (or attached the device to a necklace or chain and wear around their neck) so that the camera lens is facing in their view direction. The camera includes a 180° FOV that allows the camera to capture almost everything that the user is currently seeing. The user can start recording by simply tapping the surface of the device or pressing a button or speaking a command. No additional set-up is required. A multimedia data stream (e.g., video with audio) is recorded that captures the special moments of the birthday (e.g., blowing out the candles). This "context data" is sent to cloud computing platform 102 in real-time through a wireless network (e.g., WiFi, cellular). In an embodiment, the context data is stored on the wearable multimedia device so that it can be uploaded at a later time. In another embodiment, the user can transfer the context data to another device (e.g., personal computer hard drive, smartphone, tablet computer, thumb drive) and upload the context data to cloud computing platform 102 at a later time using an application.

In an embodiment, the context data is processed by one or more applications of an application ecosystem hosted and managed by cloud computing platform 102. Applications can be accessed through their individual application programming interfaces (APIs). A custom distributed streaming pipeline is created by cloud computing platform 102 to process the context data based on one or more of the data type, data quantity, data quality, user preferences, templates and/or any other information to generate a desired presentation based on user preferences. In an embodiment, machine learning technology can be used to automatically select suitable applications to include in the data processing pipeline with or without user preferences. For example, historical user context data stored in a database (e.g., NoSQL database) can be used to determine user preferences for data processing using any suitable machine learning technology (e.g., deep learning or convolutional neural networks).

In an embodiment, the application ecosystem can include third party platforms 105 that process context data. Secure sessions are set-up between cloud computing platform 102 and third party platforms 105 to send/receive context data. This design allows third party app providers to control access to their application and to provide updates. In other embodiments, the applications are run on servers of cloud computing platform 102 and updates are sent to cloud computing platform 102. In the latter embodiment, app developers 104 can use an API provided by cloud computing platform 102 to upload and update applications to be included in the application ecosystem.

Example Data Processing System

Figure 2:
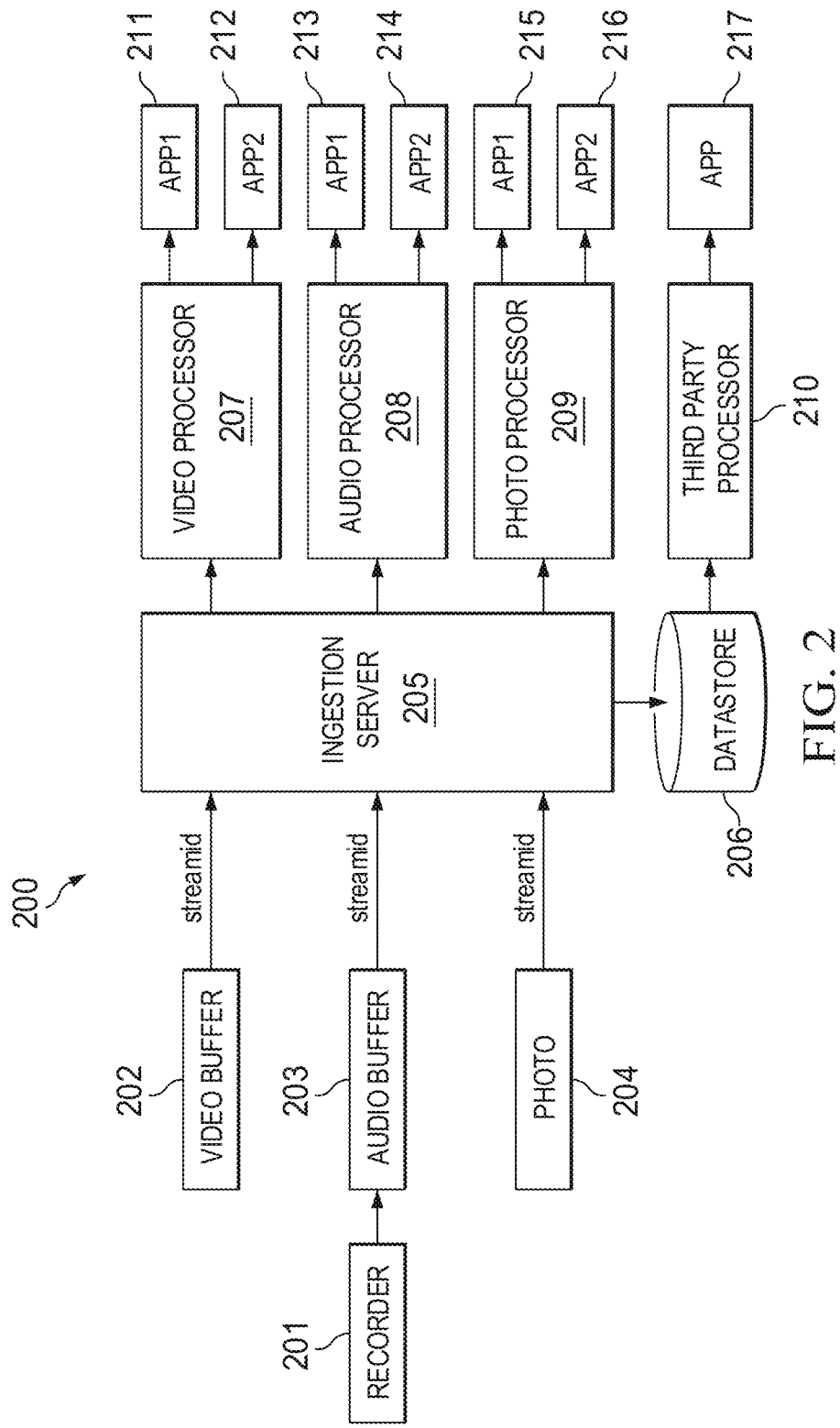
FIG. 2 is a block diagram of a data processing system implemented by the cloud computing platform of FIG. 1, according to an embodiment.

FIG. 2 is a block diagram of a data processing system implemented by the cloud computing platform of FIG. 1, according to an embodiment. Data processing system 200 includes recorder 201, video buffer 202, audio buffer 203, photo buffer 204, ingestion server 205, data store 206, video processor 207, audio processor 208, photo processor 209 and third party processor 210.

A recorder 201 (e.g., a software application) running on a wearable multimedia device records video, audio and photo data ("context data") captured by a camera and audio subsystem, and stores the data in buffers 202, 203, 204, respectively. This context data is then sent (e.g., using wireless OTA technology) to ingestion server 205 of cloud computing platform 102. In an embodiment, the data can be sent in separate data streams each with a unique stream identifier (streamid). The streams are discrete pieces of data that may contain the following example attributes: location (e.g., latitude, longitude), user, audio data, video stream of varying duration and N number of photos. A stream can have a duration of 1 to MAXSTREAM_LEN seconds, where in this example MAXSTREAM_LEN=20 seconds.

Ingestion server 205 ingests the streams and creates a stream record in data store 206 to store the results of processors 207-209. In an embodiment, the audio stream is processed first and is used to determine the other streams that are needed. Ingestion server 205 sends the streams to the appropriate processor 207-209 based on streamid. For example, the video stream is sent to video processor 207, the audio stream is sent to audio processor 208 and the photo stream is sent to photo processor 209. In an embodiment, at least a portion of data collected from the wearable multimedia device (e.g., image data) is processed into metadata and encrypted so that it can be further processed by a given application and sent back to the wearable multimedia device or other device.

Processors 207-209 can run proprietary or third party applications as previously described. For example, video processor 207 can be a video processing server that sends raw video data stored in video buffer 202 to a set of one or more image processing/editing applications 211, 212 based on user preferences or other information. Processor 207 sends requests to applications 211, 212, and returns the results to ingestion server 205. In an embodiment, third party processor 210 can process one or more of the streams using its own processor and application. In another example, audio processor 208 can be an audio processing server that sends speech data stored in audio buffer 203 to a speech-to-text converter application 213.

Example Scene Identification Application

Figure 3:
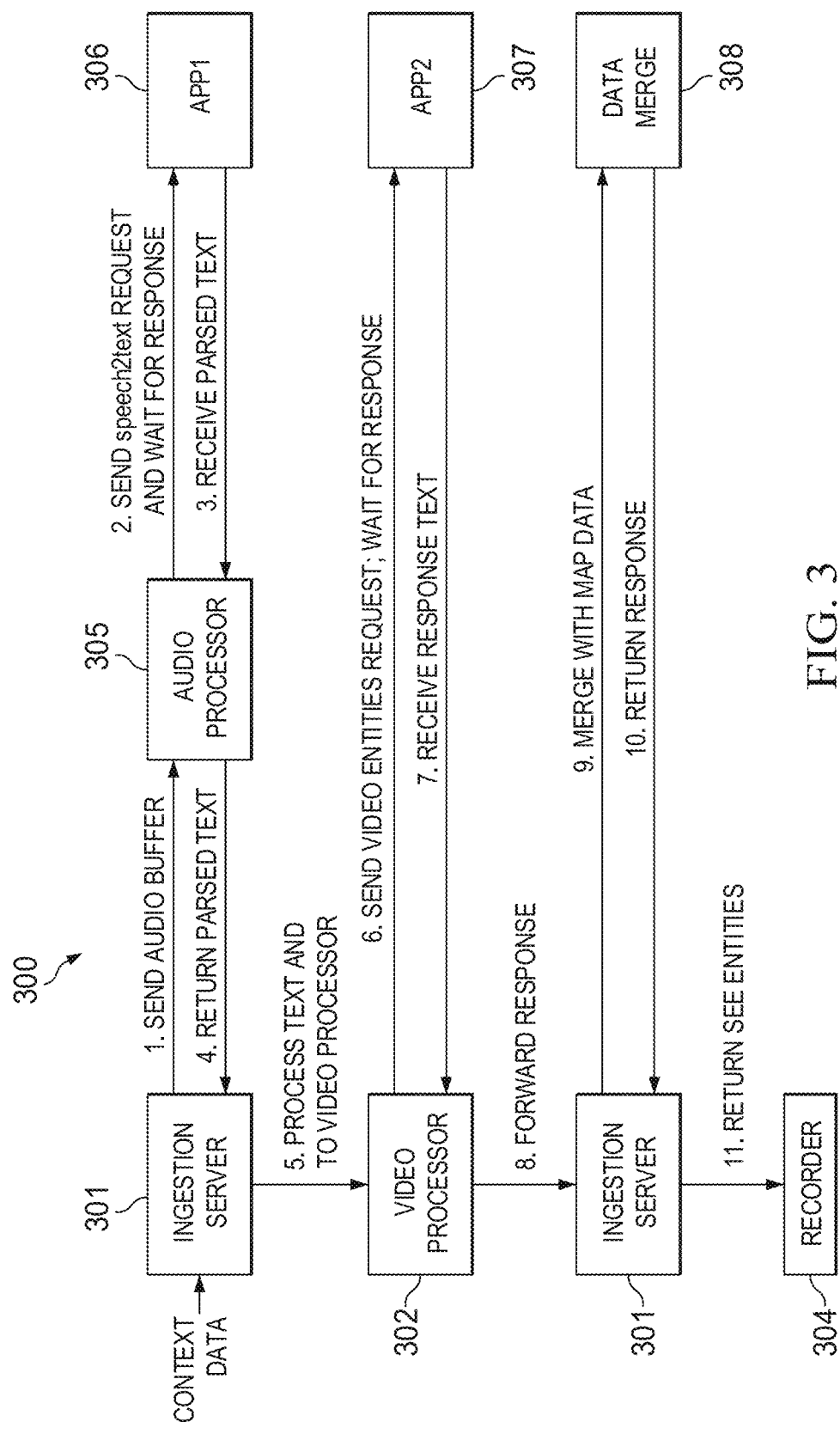
FIG. 3 is a block diagram of a data processing pipeline for processing a context data stream, according to an embodiment.

FIG. 3 is a block diagram of a data processing pipeline for processing a context data stream, according to an embodiment. In this embodiment, data processing pipeline 300 is created and configured to determine what the user is seeing based on the context data captured by a wearable multimedia device worn by the user. Ingestion server 301 receives an audio stream (e.g., including user commentary) from audio buffer 203 of wearable multimedia device and sends the audio stream to audio processor 305. Audio processor 305 sends the audio stream to app 306 which performs speech-to-text conversion and returns parsed text to audio processor 305. Audio processor 305 returns the parsed text to ingestion server 301.

Video processor 302 receives the parsed text from ingestion server 301 and sends a request to video processing app 307. Video processing app 307 identifies objects in the video scene and uses the parsed text to label the objects. Video processing app 307 sends a response describing the scene (e.g., labeled objects) to video processor 302. Video processor then forwards the response to ingestion server 301. Ingestion server 301 sends the response to data merge process 308, which merges the response with the user's location, orientation and map data. Data merge process 308 returns a response with a scene description to recorder 304 on the wearable multimedia device. For example, the response can include text describing the scene as the child's birthday party, including a map location and a description of objects in the scene (e.g., identify people in the scene). Recorder 304 associates the scene description with the multimedia data (e.g., using a streamid) stored on the wearable multimedia device. When the user recalls the data, the data is enriched with the scene description.

In an embodiment, data merge process 308 may use more than just location and map data. There can also be a notion of ontology. For example, the facial features of the user's Dad captured in an image can be recognized by the cloud computing platform, and be returned as "Dad" rather than the user's name, and an address such as "555 Main Street, San Francisco, Calif." can be returned as "Home." The ontology can be specific to the user and can grow and learn from the user's input.

Example Transportation Application

Figure 4:
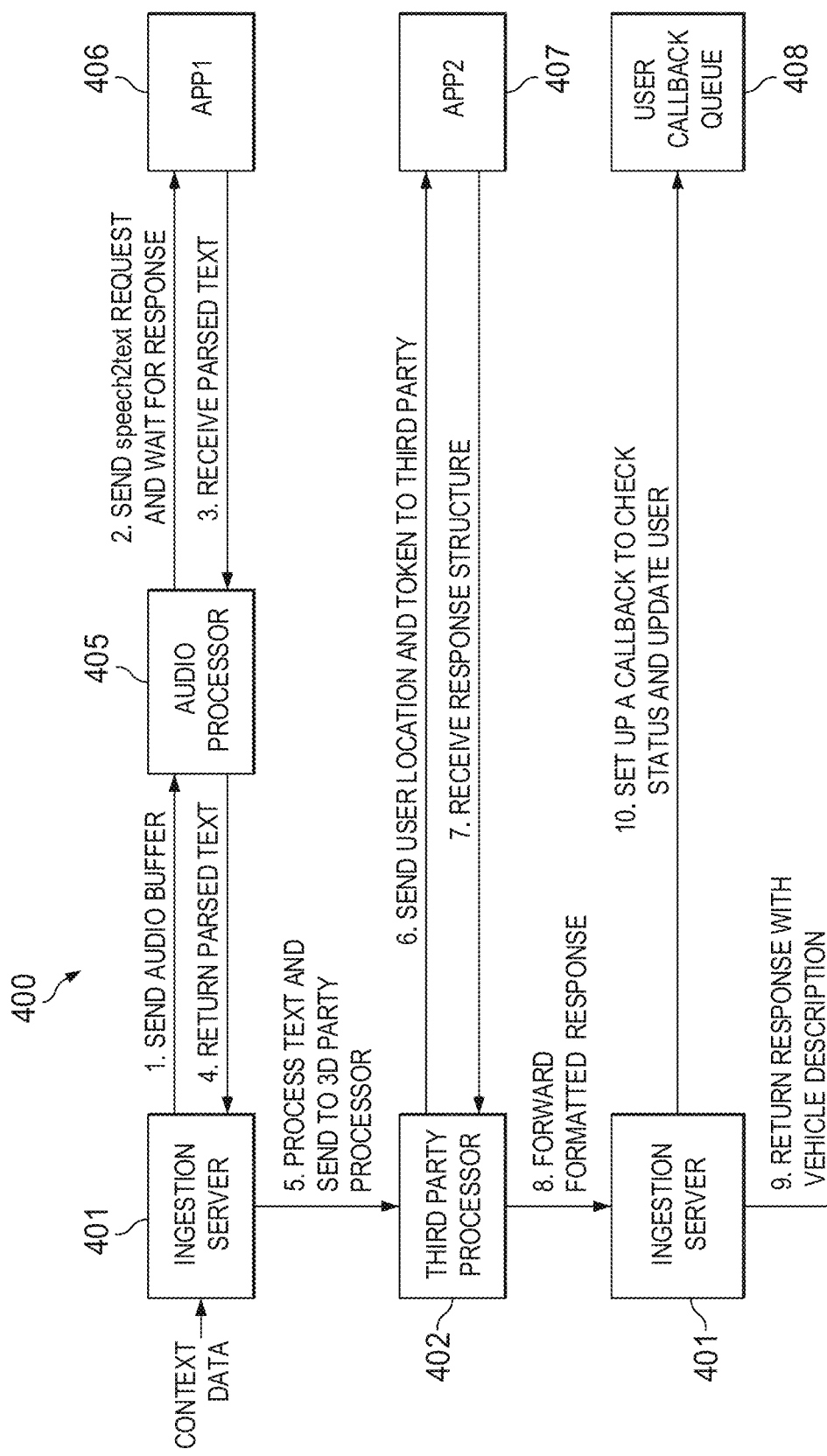
FIG. 4 is a block diagram of another data processing for processing a context data stream for a transportation application, according to an embodiment.

FIG. 4 is a block diagram of another data processing for processing a context data stream for a transportation application, according to an embodiment. In this embodiment, data processing pipeline 400 is created to call a transportation company (e.g., Uber®, Lyft®) to get a ride home. Context data from a wearable multimedia device is received by ingestion server 401 and an audio stream from an audio buffer 203 is sent to audio processor 405. Audio processor 405 sends the audio stream to app 406, which converts the speech to text. The parsed text is returned to audio processor 405, which returns the parsed text to ingestion server 401 (e.g., a user speech request for transportation). The processed text is sent to third party processor 402. Third party processor 402 sends the user location and a token to a third party application 407 (e.g., Uber® or Lyft™® application). In an embodiment, the token is an API and authorization token used to broker a request on behalf of the user. Application 407 returns a response data structure to third party processor 402, which is forwarded to ingestion server 401. Ingestion server 401 checks the ride arrival status (e.g., ETA) in the response data structure and sets up a callback to the user in user callback queue 408. Ingestion server 401 returns a response with a vehicle description to recorder 404, which can be spoken to the user by a digital assistant through a loudspeaker on the wearable multimedia device, or through the user's headphones or earbuds via a wired or wireless connection.

FIG. 5 illustrates data objects used by the data processing system of FIG. 2, according to an embodiment. The data objects are part of software component infrastructure instantiated on the cloud computing platform. A "streams" object includes the data streamid, deviceid, start, end, lat, lon, attributes and entities. "Streamid" identifies the stream (e.g., video, audio, photo), "deviceid" identifies the wearable multimedia device (e.g., a mobile device ID), "start" is the start time of the context data stream, "end" is the end time of the context data stream, "lat" is the latitude of the wearable multimedia device, "lon" is the longitude of the wearable multimedia device, "attributes" include, for example, birthday, facial points, skin tone, audio characteristics, address, phone number, etc., and "entities" make up an ontology. For example, the name "John Do" would be mapped to "Dad" or "Brother" depending on the user.

A "Users" object includes the data userid, deviceid, email, fname and lname. Userid identifies the user with a unique identifier, deviceid identifies the wearable device with a unique identifier, email is the user's registered email address, fname is the user's first name and lname is the user's last name. A "Userdevices" object includes the data userid and deviceid. A "devices" object includes the data deviceid, started, state, modified and created. In an embodiment, deviceid is a unique identifier for the device (e.g., distinct from a MAC address). Started is when the device was first started. State is on/off/sleep. Modified is the last modified date, which reflects the last state change or operating system (OS) change. Created is the first time the device was turned on.

A "ProcessingResults" object includes the data streamid, ai, result, callback, duration an accuracy. In an embodiment, streamid is each user stream as a Universally Unique Identifier (UUID). For example, a stream that was started from 8:00 AM to 10:00 AM will have id:15h158dhb4 and a stream that starts from 10:15 AM to 10:18 AM will have a UUID that was contacted for this stream. AI is the identifier for the platform application that was contacted for this stream. Result is the data sent from the platform application. Callback is the callback that was used (versions can change hence the callback is tracked in case the platform needs to replay the request). Accuracy is the score for how accurate the result set is. In an embodiment, processing results can be used for multiple tasks, such as 1) to inform the merge server of the full set of results, 2) determine the fastest AI so that user experience can be enhanced, and 3) determine the most accurate ai. Depending on the use case, one may favor speed over accuracy or vice versa.

An "Entities" object includes the data entityID, userID, entityName, entityType and entityAttribute. EntityID is a UUID for the entity and an entity having multiple entries where the entityID references the one entity. For example, "Barack Obama" would have an entityID of 144, which could be linked in an associations table to POTUS44 or "Barack Hussein Obama" or "President Obama." UserID identifies the user that the entity record was made for. EntityName is the name that the userID would call the entity. For example, Malia Obama's entityName for entityID 144 could be "Dad" or "Daddy." EntityType is a person, place or thing. EntityAttribute is an array of attributes about the entity that are specific to the userID's understanding of that entity. This maps entities together so that when, for example, Malia makes the speech query: "Can you see Dad?", the cloud computing platform can translate the query to Barack Hussein Obama and use that in brokering requests to third parties or looking up information in the system.

Example Processes

Figure 6:
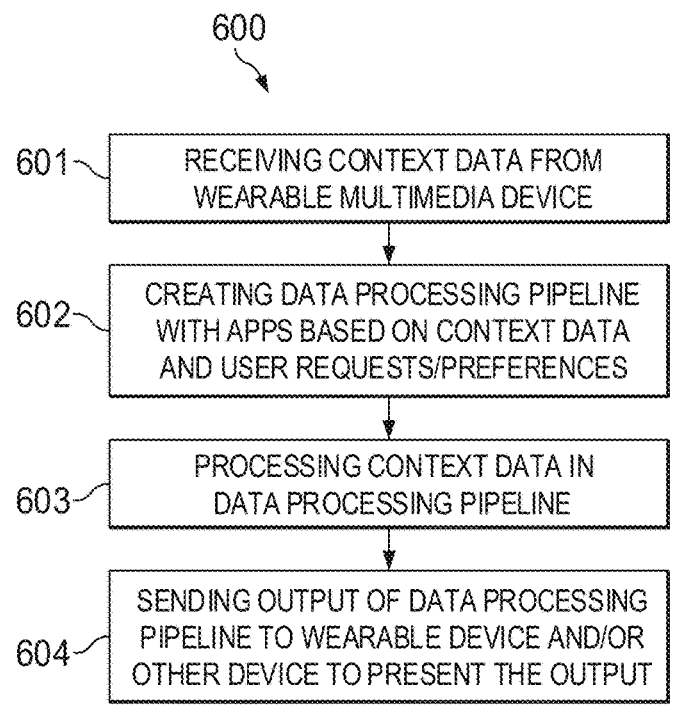
FIG. 6 is a flow diagram of a data pipeline process, according to an embodiment.

FIG. 6 is flow diagram of a data pipeline process, according to an embodiment. Process 600 can be implemented using wearable multimedia devices 101 and cloud computing platform 102 described in reference to FIGS. 1-5.

Process 600 can begin by receiving context data from a wearable multimedia device (601). For example, the context data can include video, audio and still images captured by a camera and audio subsystem of the wearable multimedia device.

Process 600 can continue by creating (e.g., instantiating) a data processing pipeline with applications based on the context data and user requests/preferences (602). For example, based on user requests or preferences, and also based on the data type (e.g., audio, video, photo), one or more applications can be logically connected to form a data processing pipeline to process the context data into a presentation to be playback on the wearable multimedia device or another device.

Process 600 can continue by processing the context data in the data processing pipeline (603). For example, speech from user commentary during a moment or transaction can be converted into text, which is then used to label objects in a video clip.

Process 600 can continue by sending the output of the data processing pipeline to the wearable multimedia device and/or other playback device (604).

Example Cloud Computing Platform Architecture

Figure 7:
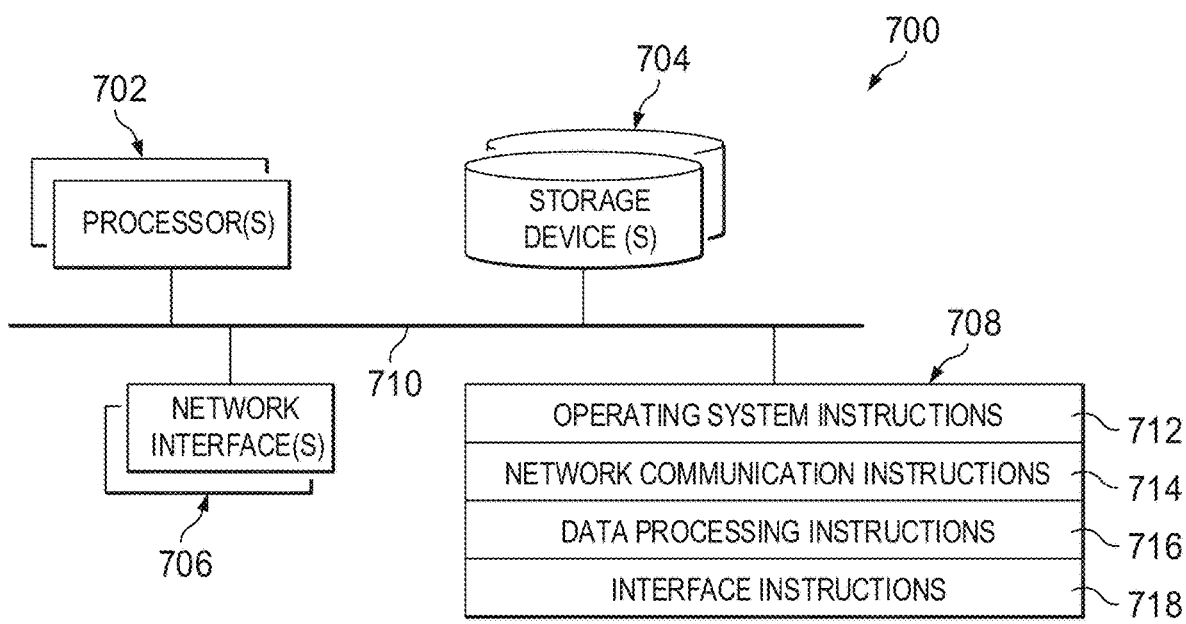
FIG. 7 is an architecture for the cloud computing platform, according to an embodiment.

FIG. 7 is an example architecture 700 for cloud computing platform 102 described in reference to FIGS. 1-6, according to an embodiment. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium(s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows® NT server, Linux Server), network communication module 714, interface instructions 716 and data processing instructions 718.

Operating system 712 can be multi-user, multiprocessing, multitasking, multithreading, real time, etc. Operating system 712 performs basic tasks, including but not limited to: recognizing input from and providing output to devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.) and for creating a distributed streaming platform using, for example, Apache Kafka™. Data processing instructions 716 include server-side or backend software for implementing the server-side operations, as described in reference to FIGS. 1-6. Interface instructions 718 includes software for implementing a web server and/or portal for sending and receiving data to and from wearable multimedia devices 101, third party application developers 104 and third party platforms 105, as described in reference to FIG. 1.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Wearable Multimedia Device Architecture

Figure 8:
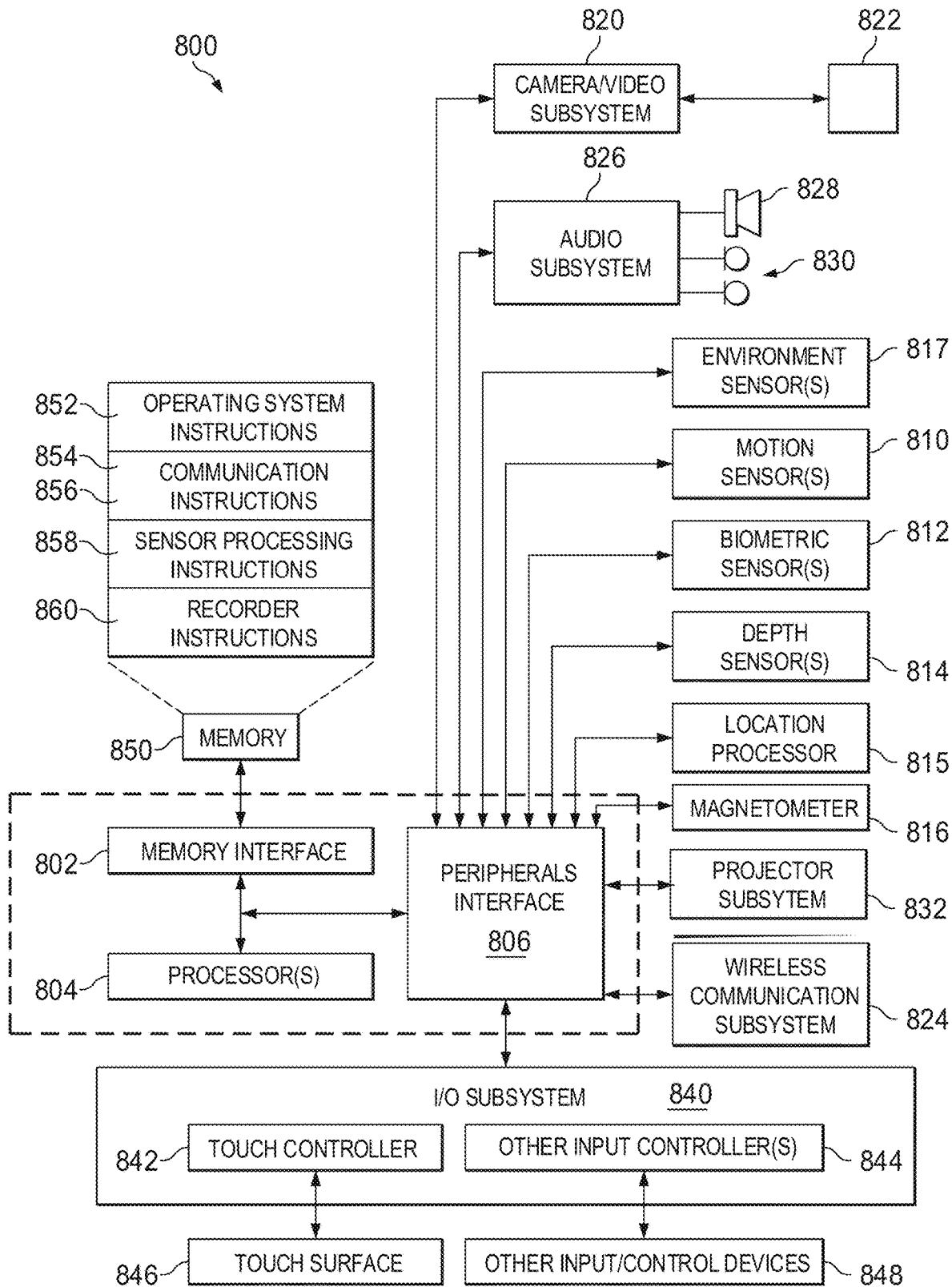
FIG. 8 is an architecture for the wearable multimedia device, according to an embodiment.

FIG. 8 is a block diagram of example architecture 800 for a wearable multimedia device implementing the features and processes described in reference to FIGS. 1-6. Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functions. For example, motion sensor(s) 810, biometric sensor(s) 812, and depth sensor(s) 814 may be coupled to peripherals interface 806 to facilitate motion, orientation, biometric, and depth detection functions. In some implementations, motion sensor(s) 810 (e.g., an accelerometer, rate gyroscope) may be utilized to detect movement and orientation of the wearable multimedia device.

Other sensors may also be connected to peripherals interface 806, such as environmental sensor(s) (e.g., temperature sensor, barometer, ambient light) to facilitate environment sensing functions. For example, a biometric sensor can detect fingerprints, face recognition, heart rate and other fitness parameters. In an embodiment, a haptic motor (not shown) can be coupled to the peripheral interface, which can provide vibration patterns as haptic feedback to the user.

Location processor 815 (e.g., GNSS receiver chip) may be connected to peripherals interface 806 to provide geo-referencing. Electronic magnetometer 816 (e.g., an integrated circuit chip) may also be connected to peripherals interface 806 to provide data that may be used to determine the direction of magnetic North. Thus, electronic magnetometer 816 may be used by an electronic compass application.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and OIS. The depth sensor can include an infrared emitter that projects dots in a known pattern onto an object/subject. The dots are then photographed by a dedicated infrared camera and analyzed to determine depth data. In an embodiment, a time-of-flight (TOF) camera can be used to resolve distance based on the known speed of light and measuring the time-of-flight of a light signal between the camera and an object/subject for each point of the image.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., WiFi, WiMax, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and beamforming.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

Further, a projector subsystem 832 may be connected to peripherals interface 806 to present information visually to a user in the form of projected light. For example, the projector subsystem 832 can project light onto a surface according to a particular spatial and/or temporal pattern, such that the user perceives text, images, videos, colors, patterns, and/or any other graphical information on the surface. In some implementations, the projector subsystem 832 can project light onto a surface of the user's body, such as the user's hand or palm. In some implementations, the projector subsystem 832 can project light onto a surface other than the user's body, such as a wall, a table, a desk, or any other object. The projector subsystem 832 is described in greater detail with reference to FIG. 9.

In some implementations, the projector subsystem 832 project light onto a surface to provide an interactive VI for a user. For example, the projector subsystem 832 can project light onto the surface, such that the user perceives one or more interactive user interface elements (e.g., selectable buttons, dials, switches, boxes, images, videos, text, icons, etc.). Further, the user can interact with the VI by performing one or more gestures with respect to the VI and the user interface elements. For example, the user can perform a pointing gesture, a tapping gesture, a swiping gesture, a waving gesture, or any other gesture using her hands and/or fingers. In some implementations, a user can perform a gesture using a single hand at a time (e.g., using the hand upon which the VI is projected or her other hand). In some implementations, a user can perform a gesture using two hands concurrently. The wearable multimedia device can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804). Example VIs are described in further detail below.

In some implementations, the wearable multimedia device 101 can detect the type of surface that is positioned in the projection area of the projector subsystem 832 (e.g., using the camera/video subsystems 820, environment sensor(s) 817, depth sensor(s) 814, etc.), and adjust one or more characteristics of the VI based on the type of surface that is detected. This can be beneficial, for example, in improving the legibility and usability of the VI in different operating environments and/or use cases.

As an example, the wearable multimedia device 101 can detect that a surface of the user's hand (e.g., the user's palm) is positioned in the projection area of the projector subsystem. As the surface area of the user's hand may be constrained (e.g., compared to a surface of a desk or wall), the wearable multimedia device 101 can reduce the overall size of the VI, such that the VI can be presented in its entirety on the user hand. Further, the wearable multimedia device 101 can adjust the size, colors, shapes, spacing, complexity, and/or other visual characteristics of the use interface elements of the VI, such that the user can readily interpret and/or interact with each of the user interface elements.

As an example, the wearable multimedia device 101 can detect that a surface of a wall, table, desk, etc. is positioned in the projection area of the projector subsystem. As the surface area of a wall, table, desk, etc. may be larger (e.g., compared to a surface of the user's hand), the wearable multimedia device 101 can increase the overall size of the VI to make better use of the larger projection surface. Further, the wearable multimedia device 101 can adjust the size, colors, shapes, spacing, complexity, and/or other visual characteristics of the use interface elements of the VI, such that the user can readily interpret and/or interact with each of the user interface elements.

In some implementations, device 800 plays back to a user recorded audio and/or video files (including spatial audio), such as MP3, AAC, spatial audio and MPEG video files. In some implementations, device 800 may include the functionality of an MP3 player and may include a pin connector or other port for tethering to other devices. Other input/output and control devices may be used. In an embodiment, device 800 may include an audio processing unit for streaming audio to an accessory device over a direct or indirect communication link.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, iOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location of the device.

Memory 850 may include sensor processing instructions 858 to facilitate sensor-related processing and functions and recorder instructions 860 to facilitate recording functions, as described in reference to FIGS. 1-6. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

Figure 9:
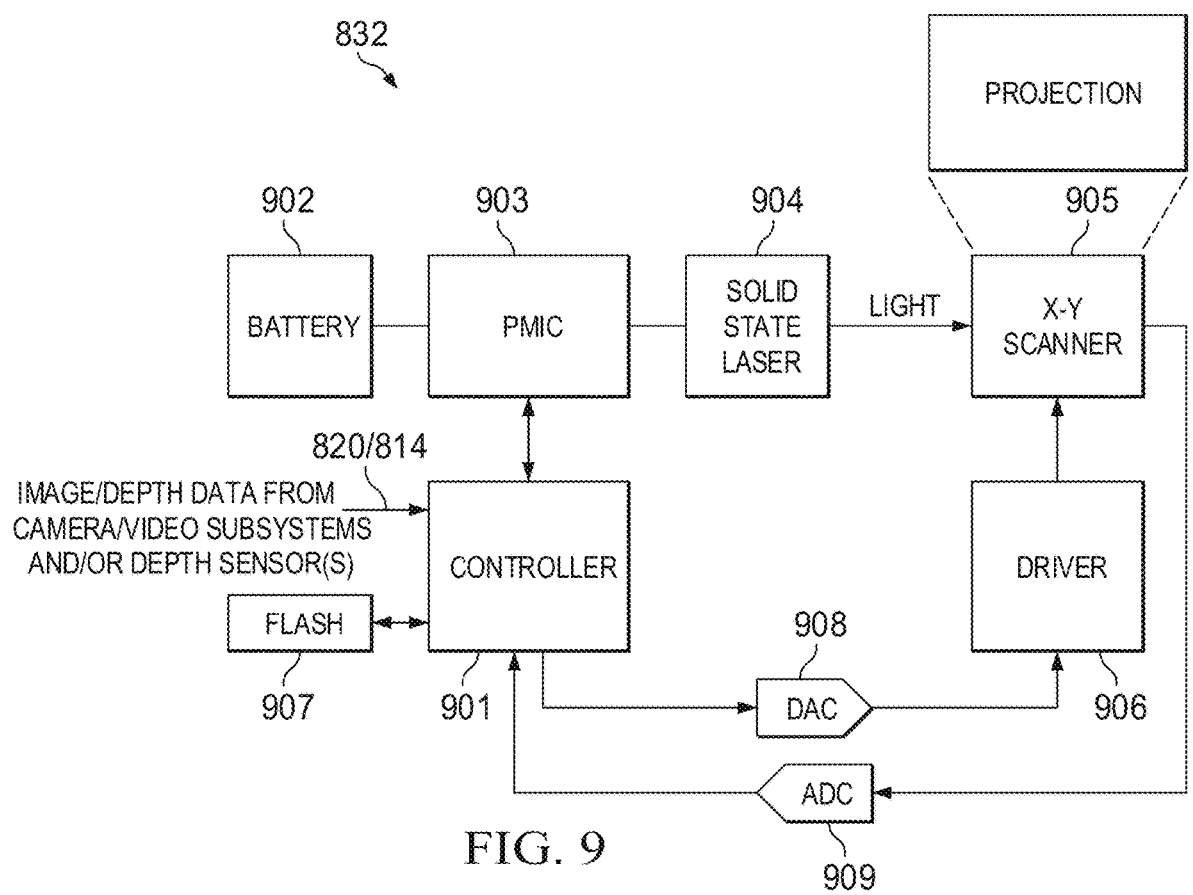
FIG. 9 is a system block diagram of a projector architecture, according to an embodiment.

FIG. 9 is a system block diagram of the projector subsystem 832, according to an embodiment. The projector subsystem 832 scans a pixel in two dimensions, images a 2D array of pixels, or mixes imaging and scanning. Scanning projectors directly utilize the narrow divergence of laser beams, and two-dimensional (2D) scanning to "paint" an image pixel by pixel. In some embodiments, separate scanners are used for the horizontal and vertical scanning directions. In other embodiments, a single biaxial scanner is used. The specific beam trajectory also varies depending on the type of scanner used.

In the example shown, the projector subsystem 832 is a scanning pico-projector that includes controller 901, battery 902, power management chip (PMIC) 903, solid state laser 904, X-Y scanner 905, driver 906, memory 907, digital-to-analog converter (DAC) 908 and analog-to-digital converter (ADC) 909.

Controller 901 provides control signals to X-Y scanner 905. X-Y scanner 905 uses moveable mirrors to steer the laser beam generated by solid state laser 904 in two dimensions in response to the control signals. X-Y scanner 95 includes one or more micro-electromechanical (MEMS) micromirrors that have controllable tilt angles in one or two dimensions. Driver 906 includes a power amplifier and other electronic circuitry (e.g., filters, switches) to provide the control signals (e.g., voltages or currents) to X-Y scanner 905. Memory 907 stores various data used by the projector including laser patterns for text and images to be projected. DAC 908 and ADC 909 provide data conversion between digital and analog domains. PMIC 903 manages the power and duty cycle of solid state laser 1904, including turning on and shutting of solid state laser 904 and adjusting the amount of power supplied to solid state laser 904. Solid state laser 904 can be, for example, a vertical-cavity surface-emitting laser (VCSEL).

In an embodiment, controller 901 uses image data from the camera/video subsystem 820 and/or depth data from the depth sensor(s) 814 to recognize and track user hand and/or finger positions on the laser projection, such that user input is received by the wearable multimedia device 101 using the laser projection as an input interface.

In another embodiment, the projector subsystem 832 uses a vector-graphic projection display and low-powered fixed MEMS micromirrors to conserve power. Because the projector subsystem 832 includes a depth sensor, the projected area can be masked when necessary to prevent projecting on a finger/hand interacting with the laser projected image. In an embodiment, the depth sensor can also track gestures to control the input on another devices (e.g., swiping through images on a TV screen, interacting with computers, smart speakers, etc.).

In other embodiments, Liquid Crystal on Silicon (LCoS or LCOS), Digital Light Processing (DLP) or Liquid Chrystal Display (LCD) digital projection technology can be used instead of a pico-projector.

Example Virtual Interfaces

As described above, a wearable multimedia device 101 can include a projector subsystem 832 configured to present information visually to a user in the form of projected light. For example, the projector subsystem 832 can project light onto a surface (e.g., a surface of a user's hand, such as the user's palm) according to a particular spatial and/or temporal pattern, such that the user perceives text, images, videos, colors, patterns, and/or any other graphical information on the surface.

Further, the user can perform gestures to interact with the VI. For instance, the user can perform one or more gestures directed at one or more of the user interface elements. As examples, the user can point to a user interface element, touch or tap a user interface element using her finger (e.g., a single time, or multiple times in a sequence), perform a swiping motion along a user interface element using her finger, wave at a user interface element using her hand, hover over the user interface element, or perform any other hand or finger gesture. In some implementations, a user can perform a gesture using a single hand at a time (e.g., using the hand upon which the VI is projected or her other hand). In some implementations, a user can perform a gesture using two hands concurrently. The wearable multimedia device 101 can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804).

At least some of the user interface elements and/or commands can be used to control the operation of the wearable multimedia device 101. For example, at least some of the user interface elements and/or commands can be used to execute or control the generation of content (e.g., content including video, images, audio, text, etc.), the viewing of content, the editing of content, the storing and transmission data, and/or any other operation described herein. As another example, at least some of the user interface elements and/or commands can be used to exchange messages (e.g., emails, chat messages, text messages, etc.) with other users. As another example, at least some of the user interface elements and/or commands can be used to generate, obtain, view, edit, transmit, and/or store mapping data. As another example, at least some of the user interface elements and/or commands can be used to generate, obtain, view, edit, transmit, and/or store calendar data.

In some implementations, a wearable multimedia device 101 can detect the hand that is presented by the user, and present different VIs and/or perform different operations depending on which hand has been presented.

As an example, the projector subsystem 832 can be configured to project light into a particular projection area (e.g., a region of space within which the projector subsystem 832 can focus and/or direct light to form visual content that can be discerned by the user). For instance, referring to FIG. 9, the projection area can be the region of space in which the X-Y scanner 905 can steer a laser beam to form projected images on a surface.

Further, the wearable multimedia device 101 can be configured to detect objects that are positioned in the projection area. For example, the wearable multimedia device 101 can obtain sensor data from one or more sensors (e.g., the camera/video subsystems 820, environment sensor(s) 817, depth sensor(s) 814, etc.), and based on the sensor data, detect whether the user has positioned a hand in the projection area. Further, based on the sensor data, the wearable multimedia device 101 can distinguish between the user positioning her right hand in the projection area and the user positioning her left hand in the projection area.

Upon detecting that the user's left hand is positioned in the projection area of the projector subsystem, the wearable multimedia device can perform one or more first operations. As an example, the wearable multimedia device can execute one or more first applications, present one or more first VIs on the surface of the user's left hand, and/or perform one or more first functions or tasks. Further, upon detecting that the user's right hand is positioned in the projection area of the projector subsystem, the wearable multimedia device can perform one or more second operations. As an example, the wearable multimedia device can execute one or more second applications, present one or more second VIs on the surface of the user's right hand, and/or perform one or more second functions or tasks.

Figure 10B:
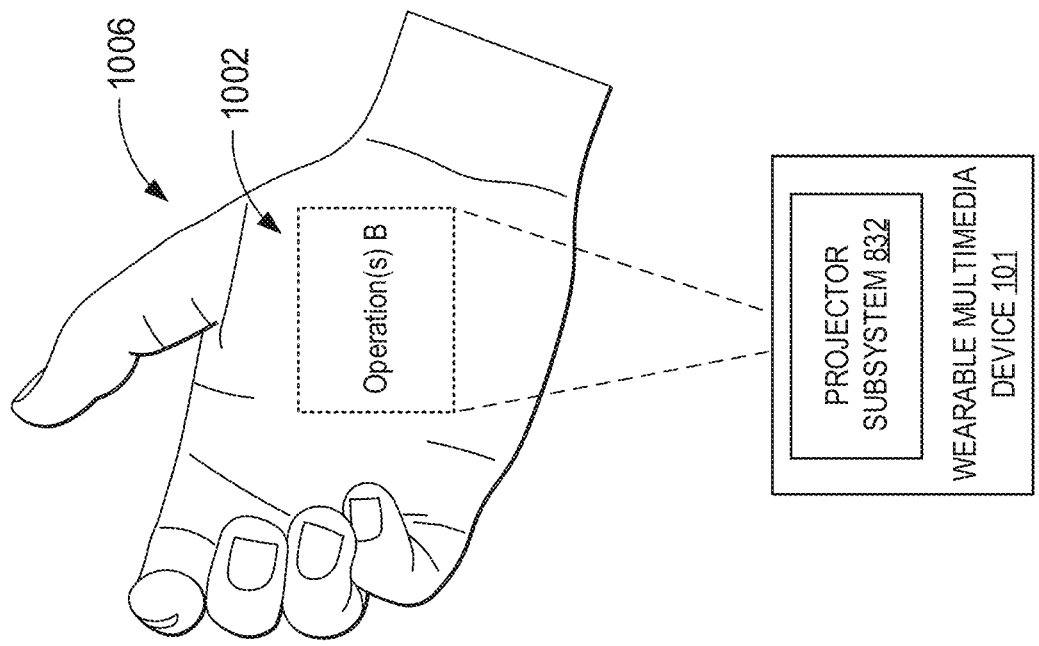
FIGS. 10A and 10B are diagrams of example hand-specific operations performed by a wearable multimedia device.
Figure 10A:
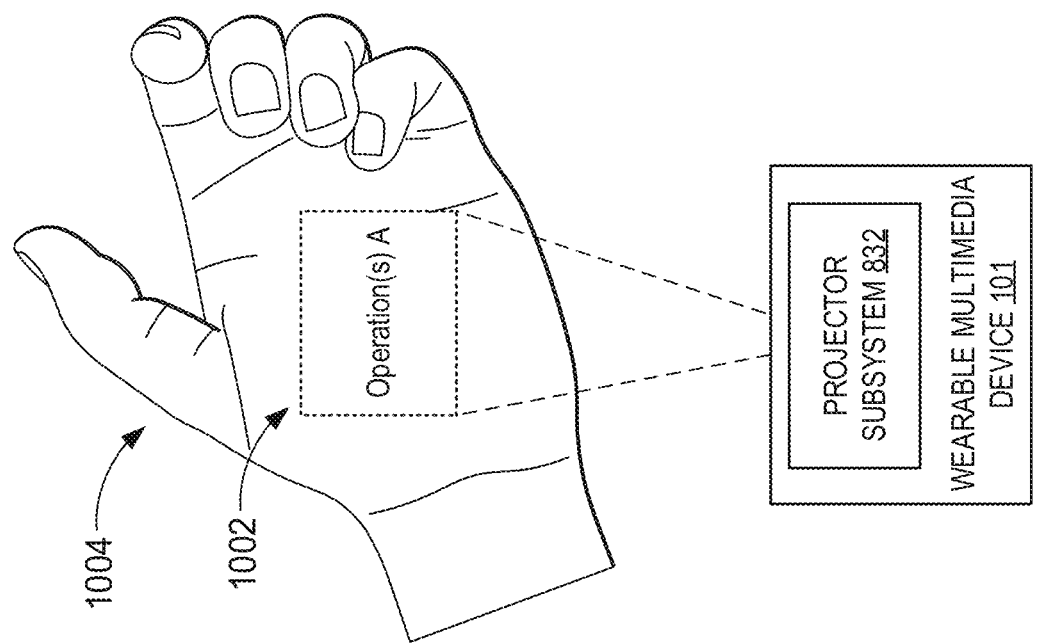

For instance, referring to FIG. 10A, a projector subsystem 832 can be configured to project light into a projection area 1002 (represented as a dashed outline). Although the projection area 1002 is depicted in FIG. 10A as a rectangular region of space, in practice, the projection area 1002 can be any shape (e.g., polygonal, curved, and/or a combination thereof). In this example, the user has positioned her left hand 1004 within the projection area 1002. The wearable multimedia 101 detects the presence of the user's left hand 1004 in the projection area 1002 (e.g., using the camera/video subsystems 820, environment sensor(s) 817, depth sensor(s) 814, etc.), and in response performs one or more first operations ("Operation(s) A").

In the example shown in FIG. 10B, the user has positioned her right hand 1006 within the projection area 1002. The wearable multimedia 101 detects the presence of the user's right hand 10006 in the projection area 1002 (e.g., using the camera/video subsystems 820, environment sensor(s) 817, depth sensor(s) 814, etc.), and in response performs one or more second operations ("Operation(s) B").

In general, the first operations can include performing or providing any functionality of the wearable multimedia device 101. For example, the first operations can include executing one or more first applications, presenting one or more first VIs on the surface of the user's left hand 1004, performing one or more first functions or tasks, and/or any combination thereof.

Similarly, the second operations can include performing or providing any functionality of the wearable multimedia device 101, where at least some of the functionality is different from that of the first operations. For example, the first operations can include executing one or more first applications, presenting one or more second VIs on the surface of the user's right hand 1006, performing one or more second functions or tasks, and/or any combination thereof.

In some implementations, the user can configure the operation(s) that are associated with each hand. For example, the user can specify that the wearable multimedia device 101 present a specific VI, execute a specific application, and/or perform a specific function or task when a particular one of the user's hands is positioned in a projection area of the projector subsystem (e.g., such that the same "default" operation is performed by the wearable multimedia device 101 each time the user positions that hand in the projection area of the projector). Further, the user can specify that the wearable multimedia device present other VIs, execute other applications, and/or perform other functions or tasks when the user's other hand is positioned in a projection area of the projector subsystem (e.g., such that the user can access other functionality of the wearable multimedia device 101 by positioning her other hand in the projection area of the projector subsystem).

In some implementations, the wearable multimedia device 101 can store the user's preferences as one or more sets of configuration data (e.g., in the form of one or more data structures, records, files, etc.), and subsequently access the configuration to determine which operation(s) to perform.

As an example, the user can provide user input specifying one or more first operation(s) that are associated with her left hand. Based on the user's input, the wearable multimedia device 101 can generate a first set of configuration data indicating each of the specified first operation(s), and store the first set of configuration data for future retrieval (e.g., on the wearable multimedia device 101 itself, on remote system such as a cloud computing platform, or both). Upon detecting the user positioning her left hand in the projection area 1002, the wearable multimedia device 101 can identify the specified first operation(s) using the first set of configuration data, and perform the first operation(s).

As another example, the user can provide user input specifying one or more second operation(s) that are associated with her right hand. Based on the user's input, the wearable multimedia device 101 can generate a second set of configuration data indicating each of the specified second operation(s), and store the second set of configuration data for future retrieval (e.g., on the wearable multimedia device 101 itself, on remote system such as a cloud computing platform, or both). Upon detecting the user positioning her right hand in the projection area 1002, the wearable multimedia device 101 can identify the specified second operation(s) using the second set of configuration data, and perform the second operation(s).

These techniques can provide various technical benefits. For instance, these techniques allow the user to associate certain functions of the wearable multimedia device 101 with each hand, such that she can interact with the wearable multimedia device 101 in a more organized, consistent, predictable, and/or intuitive manner. Accordingly, the user can interact with the wearable multimedia device 101 more quickly and efficiently, and is less likely to provide erroneous and/or unintended inputs to the wearable multimedia device 101.

Further, by reducing the occurrence of erroneous and/or unintended inputs by the user, these techniques can reduce the resources expended by the wearable multimedia device 101 during operation. For instance, if a user has difficulty finding a particular option in a user interface, she may spend more time interacting with the wearable multimedia device 101 to access the desired functionality. Further, if the user provides erroneous and/or unintended inputs, she may provide further inputs in an attempt to correct or reverse her actions. Accordingly, the wearable multimedia device 101 may expend resources—such as computational resources (e.g., CPU cycles), memory resources, storage resources, network resources, and/or battery resources—that might otherwise not need to be expended. By reducing the likelihood of user error, the wearable multimedia device 101 can reduce the expenditure of resources in correcting or reversing those errors. Thus, the wearable multimedia device 101 can operate in a more efficient manner.

In some implementations, a user can associate a single operation with a particular hand, or associated multiple operations with that hand.

Figure 11B:
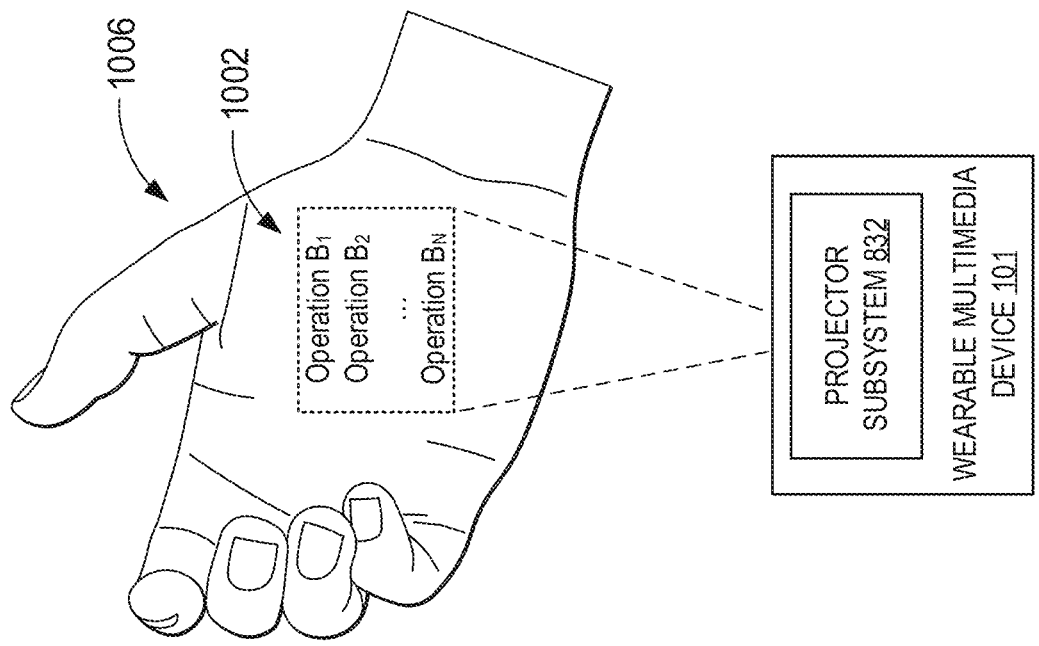
FIGS. 11A and 11B are diagrams of further example hand-specific operations performed by a wearable multimedia device.
Figure 11A:
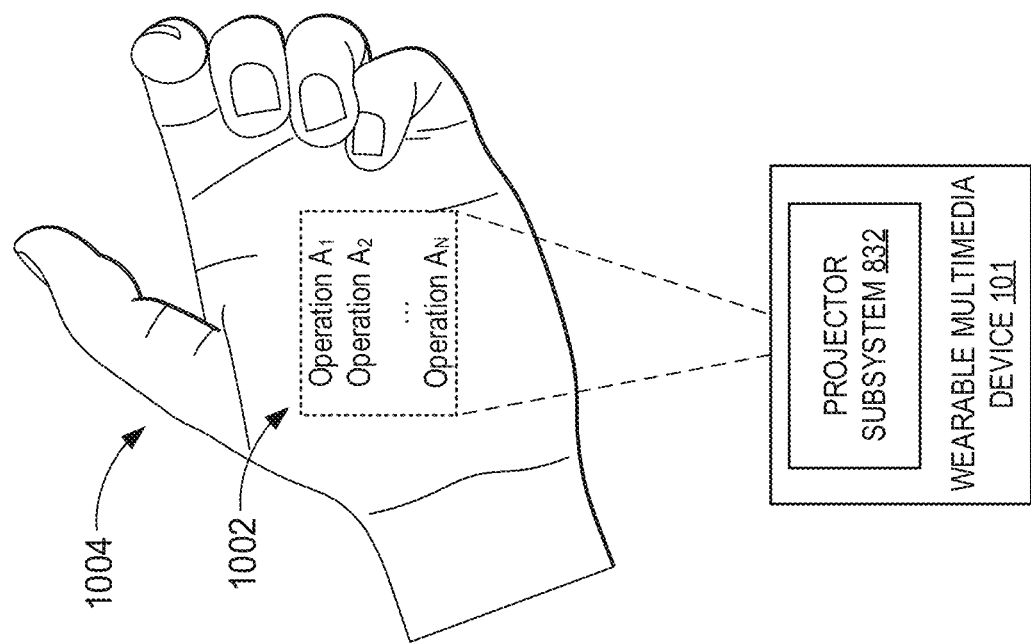

As an example, referring to FIG. 11A, a user can associate multiple operations with her left hand 1004 (e.g., "Operation $A_1$," . . . , "Operation $A_N$"). Further, referring to FIG. 11B, a user can associate multiple operations with her right hand 1006 (e.g., "Operation $B_1$," . . . , "Operation $B_N$").

Figure 12B:
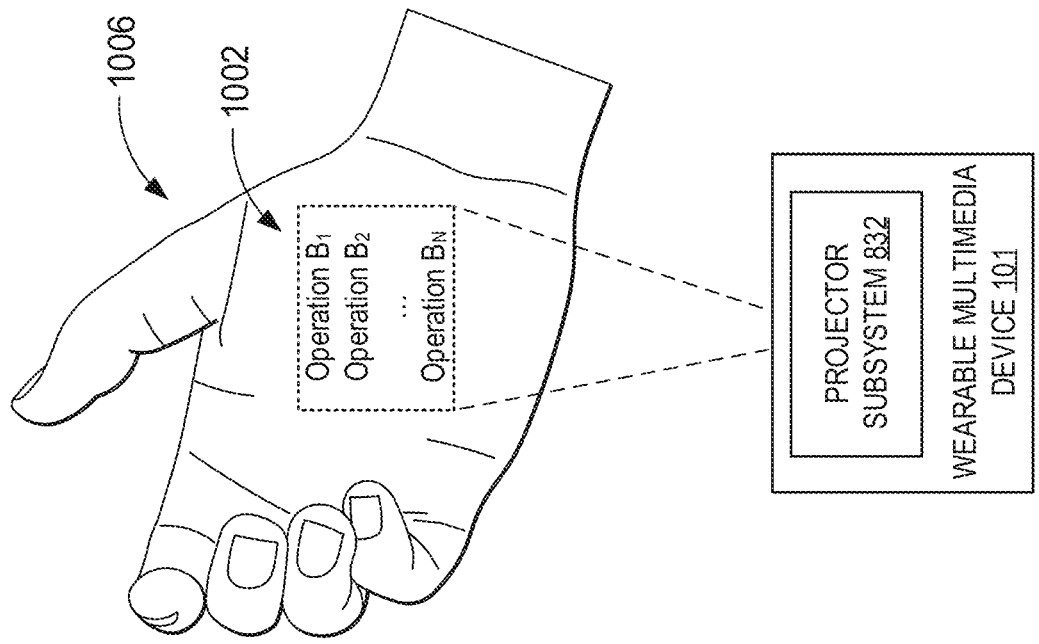
FIGS. 12A and 12B are diagrams of further example hand-specific operations performed by a wearable multimedia device.
Figure 12A:
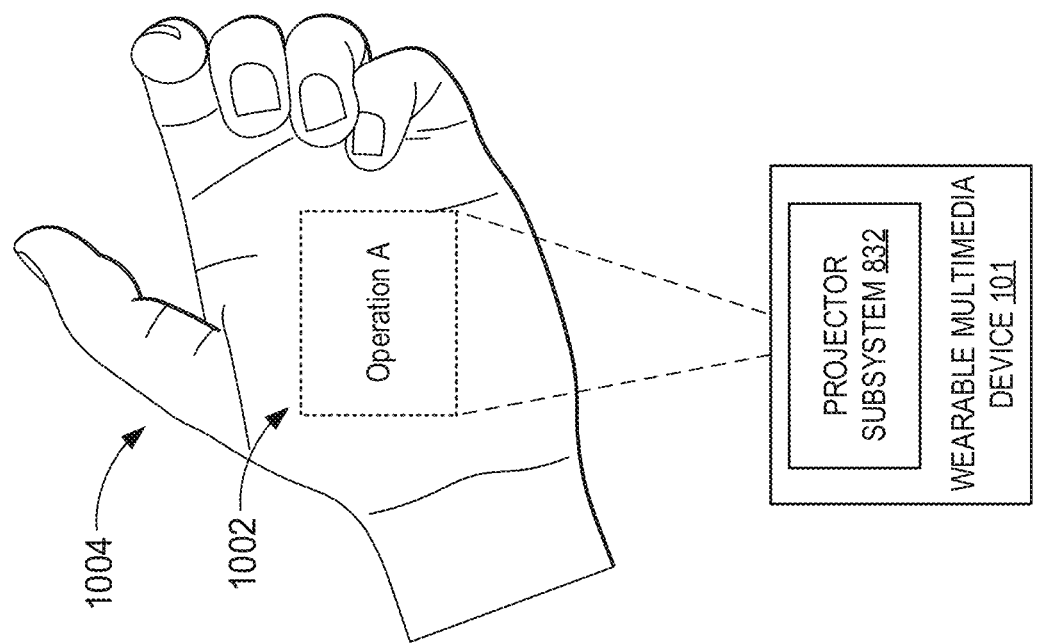

As another example, referring to FIG. 12A, a user can associate a single operate with her left hand 1004 (e.g., "Operation A"). Further, referring to FIG. 12B, a user can associate multiple operations with her right hand 1006 (e.g., "Operation $B_1$," . . . , "Operation $B_N$").

Figure 13B:
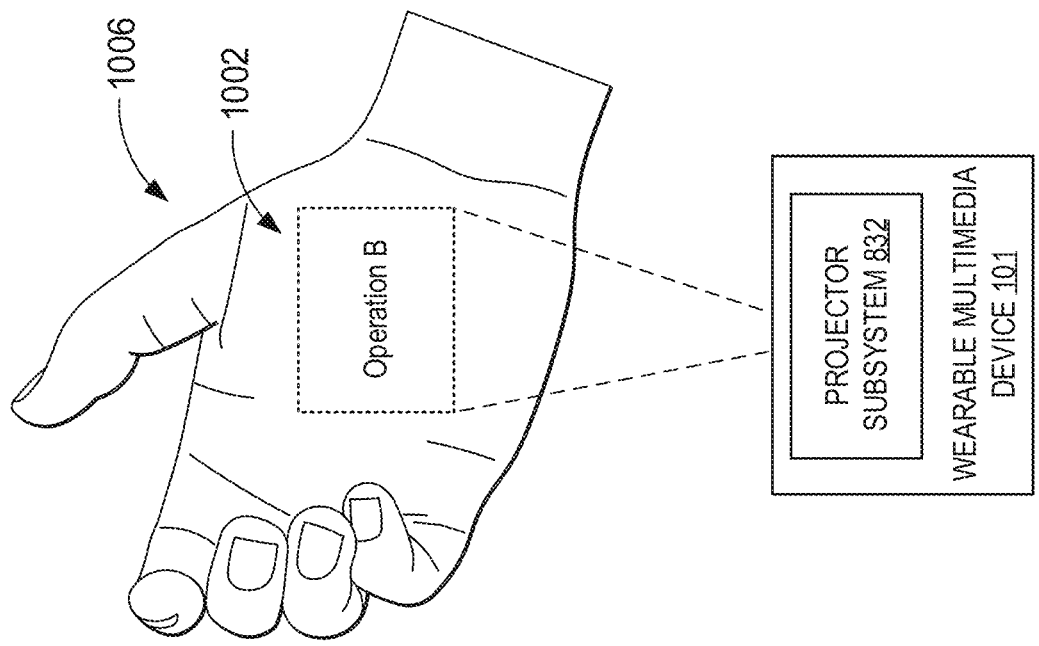
FIGS. 13A and 13B are diagrams of further example hand-specific operations performed by a wearable multimedia device.
Figure 13A:
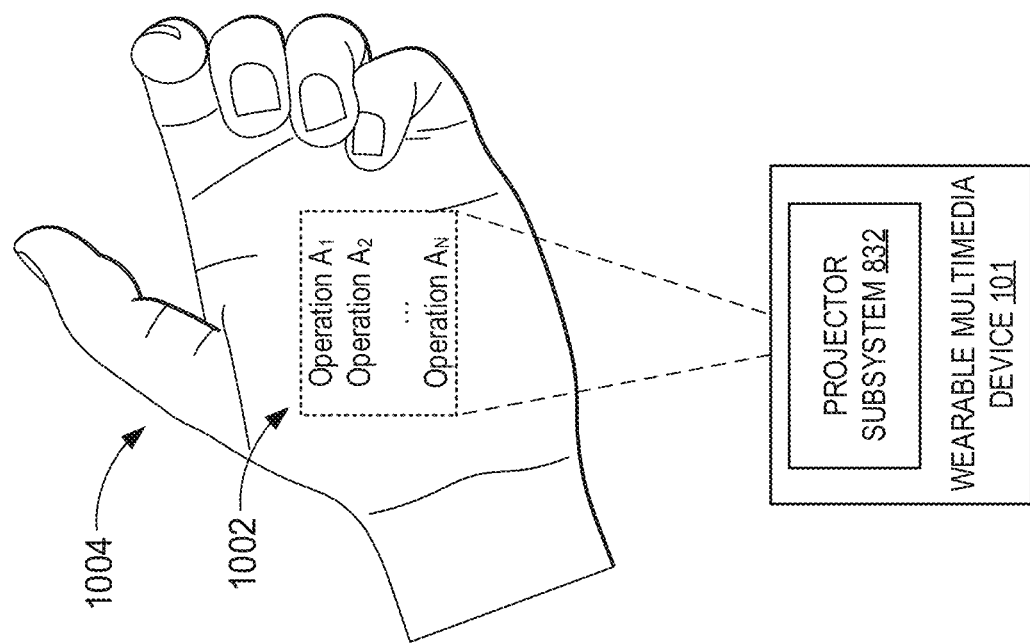

As another example, referring to FIG. 13A, a user can associate multiple operations with her left hand 1004 (e.g., "Operation $A_1$," . . . "Operation $A_N$"). Further, referring to FIG. 13B, a user can associate a single operation with her right hand 1006 (e.g., "Operation $B_1$").

At described above, different applications can be associated with each of the user's hands. Example applications include messaging applications (e.g., text messaging applications, chat applications, email applications, etc.), note taking applications (e.g., reminder applications), calendar applications, map applications, content editing applications (e.g., image, video, and/or audio editing applications), content viewing or playback applications (e.g., image, video, and/or audio viewing applications), web browser applications, financial applications, shopping or commerce applications, productivity applications (e.g., word processor applications, presentation applications, spreadsheet applications, etc.), or any other application that can be executed by the wearable multimedia device 101.

In some implementations, different categories or types of operations can be associated with each hand of the user. As an example, a communications category can include executing application(s), presenting VI(s), and/or performing function(s) or task(s) to allow the user to communicate electronically with one or more other users using the wearable multimedia device 101. For instance, the communications category can include executing a text messaging application, a chat application, e-mail application, social media application, etc. Further, the communications category can include presenting VI(s) associated with those applications, and/or performing functions or tasks to facilitate the exchange of electronic communications between users.

As another example, a mapping category can include executing application(s), presenting VI(s), and/or performing function(s) or task(s) to allow the user to determine her geographical location and/or navigate to another geographical location using the wearable multimedia device 101. For instance, the mapping category can include executing a map application, a navigation application, etc. Further, the mapping category can include presenting VI(s) associated with those applications, and/or performing functions or tasks to facilitate the presentation of mapping or navigation data to the user.

As another example, a game category can include executing application(s), presenting VI(s), and/or performing function(s) or task(s) to allow the user to play games using the wearable multimedia device 101. For instance, the game category can include executing one or more game applications. Further, the mapping category can include presenting VI(s) associated with those applications, and/or performing functions or tasks to facilitate the presentation of a game to the user.

As another example, a media content category can include executing application(s), presenting VI(s), and/or performing function(s) or task(s) to allow the user to generate, view, edit, store, and/or transmit media content using the wearable multimedia device 101. For instance, the media content category can include executing a media content editor application (e.g., a video and/or audio editing application), a media content playback application (e.g., a video and/or audio playback application), etc. Further, the media content category can include presenting VI(s) associated with those applications, and/or performing functions or tasks to facilitate the generating viewing, editing, storing, and/or transmitting of media content.

Although example categories of operations are described above, these are merely illustrative examples. In practice, other categories and/or types of operations can be associated with each of the user's hands, either instead of or in addition to those described above.

As described above, in some implementations, the user can specify that one or more "default" operations be associated with a particular hand, such that the same "default" operation(s) are performed by the wearable multimedia device 101 each time the user positions that hand in the projection area of the projector subsystem. Further, the user can specify that other operations be associated with her other hand, such that the user can access other functionality of the wearable multimedia device by positioning her other hand in the projection area of the projector subsystem.

Figure 14B:
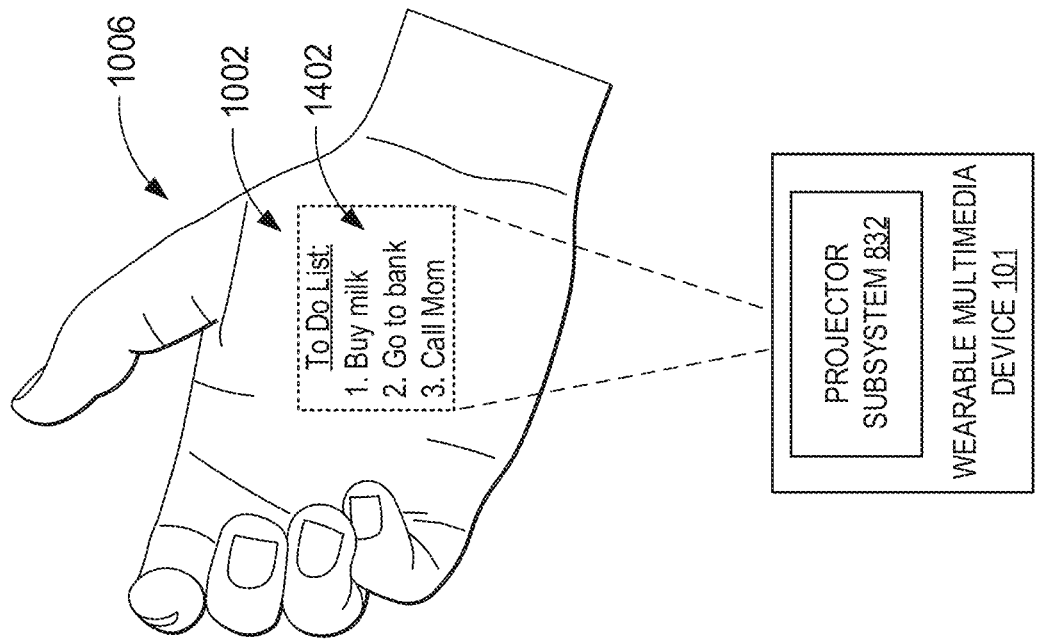
FIGS. 14A and 14B are diagrams of further example hand-specific operations performed by a wearable multimedia device.
Figure 14A:
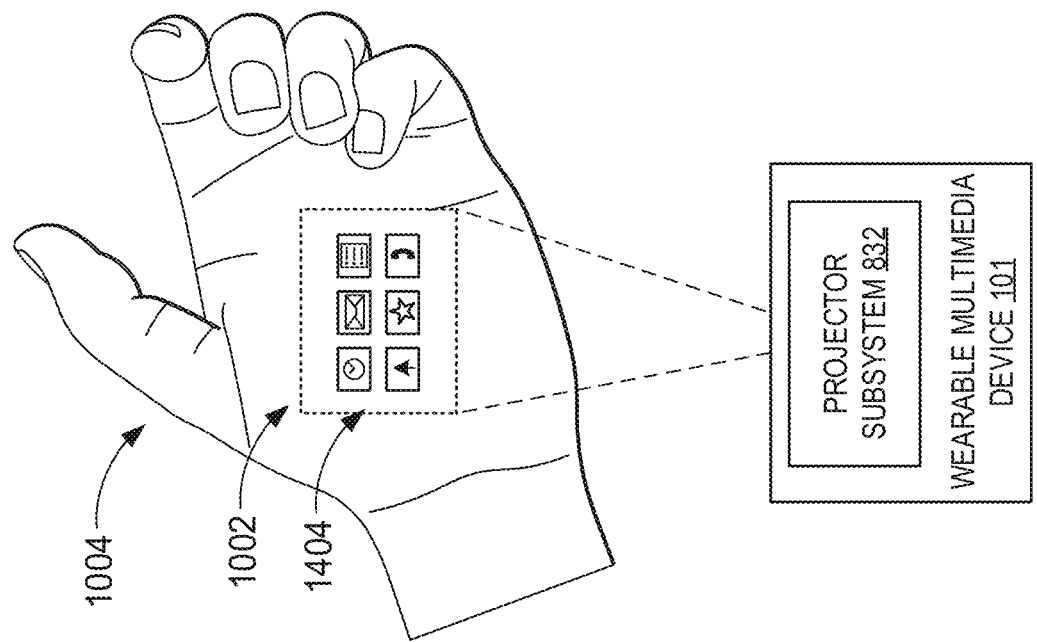

As an example, as shown in FIGS. 14A and 14B, a user can assign a reminder application or note taking application to her right hand 1006 (e.g., an application configured to present a "to do" list to the user to remind the user to perform certain tasks), and assign a "general" set of applications to her left hand 1004 (e.g., applications other than the reminder application).

Upon detecting that the user's right hand 1006 is positioned in the projection area 1002 of the projector subsystem 832, the wearable multimedia device 101 can automatically execute the reminder application or note taking application, and project a VI 1402 for interacting with the reminder application on the user's right hand 1006.

Further, upon detecting that the user's left hand 1004 is positioned in the projection area 1002 of the projector subsystem 832, the wearable multimedia device 101 can automatically project an application selection VI 1404 on the user's left hand 1006. The application selection VI 1404 can display one or more applications that are available for execution by the wearable multimedia device 101 (e.g., using one or more icons, text labels, lists, menus, user interface elements, etc.). The user can browse the application selection VI 1404 to review the available applications, and select one or more of the applications for execution by the wearable multimedia device 101.

In some implementations, the user can make a selection using her "free" hand (e.g., the hand opposite to the hand on which the application selection VI 1404 is projected). For example, referring to FIG. 14A, the user can tap or press a finger of her right hand 1006 onto the surface of her left hand 1004, such that the tip of the user's finger coincides with a particular application presented in the application selection VI 1404. In response to detecting this gesture (e.g., using the camera/video subsystems 820, environment sensor(s) 817, depth sensor(s) 814, etc.), the wearable multimedia device 101 can execute the selected application.

In some implementations, the user can also make a selection using the hand on which the application selection VI 1404 is projected. For example, referring to FIG. 14A, the user can make a selection by hovering a finger of her right hand 1006 over one application presented in the application selection VI 1404. Further, the user can confirm her selection by performing a gesture using her left hand 1004. As an example, while the user is hovering her finger of her right hand 1006 over the application, using her left hand 1004, the user can touch the tip of her thumb with the tip of another finger, such as her index finger. In response to detecting this gesture (e.g., using the camera/video subsystems 820, environment sensor(s) 817, depth sensor(s) 814, etc.), the wearable multimedia device 101 can execute the selected application.

Although an example "default" reminder application is shown in FIG. 14B, in practice, the wearable multimedia device 101 can be configured such that any other application(s) is set as the "default" application for a hand. Further, although FIG. 14B shows an example in which the user's right hand is used to access the "default" application, in practice, the wearable multimedia device 101 can be configured such that the user's left hand is used to access a "default" application. Further still, although FIG. 14A shows an example in which the user's left hand is used to access the application selection VI, in practice, the wearable multimedia device 101 can be configured such that the user's right hand is used to access an application selection VI.

As described above, a user can perform various gestures to interact with a VI and/or the wearable multimedia device 101. Example gestures include a pointing gesture, a tapping gesture, a swiping gesture, a waving gesture, or any other gesture performed using her hands and/or fingers. Further, in some implementations, a user can assign certain gestures to certain operations of the wearable multimedia device 101.

As an example, the VI can include one or more user interface elements representing points of interest (POIs). Example POIs include stores, restaurants, bars, libraries, parks, recreation areas, stadiums or arenas, homes, apartments, landmarks, or any other locations to which a user may wish to travel. In some implementations, a POI can represent the location of a person or group of people. In some implementations, a POI can represent the location of one or more items, such as keys, a wallet, a smartphone, a tablet, a computer, a vehicle, or a tracking device that can be attached to another object (e.g., a Tile® tracking device, an AirTag® tracking device, etc.). Further, the user can specify that the wearable multimedia device 101 perform a particular operation with respect to a POI, in response to the user performing a particular gesture with respect to the corresponding user interface element.

For instance, the user can specify that, in response to the user touching or pressing a user interface element, the wearable multimedia device 101 is to retrieve additional information regarding the corresponding POI, and present at least some of the information to the user (e.g., using the VI). Example information includes a physical or mailing address of the POI, a telephone number associated with POI, a website associated the POI, the operating hours of the POI, and/or additional descriptive material regarding the POI. As another example, the information can include a map of the geographical area surrounding the POI (with an indication of the location of the POI on the map). As another example, the information can include media content regarding the POI, such as photos or images, videos, audio, etc. Although a touching or pressing gesture is described above, in practice the user can assign any other gesture to these operations, depending on the implementation.

As another example, the VI can include one or more user interface elements representing objects in proximity to the user. In some implementations, the objects can be identified using one or more labels generated by the wearable multimedia device 101 (e.g., as described above). Further, the user can specify that the wearable multimedia device 101 perform a particular operation with respect to an object, in response to the user performing a particular gesture with respect to the corresponding user interface element.

For instance, the user can specify that, in response to the user touching or pressing the user interface element, the wearable multimedia device 101 is to generate content regarding the object. As an example, the wearable multimedia device 101 can generate a content item regarding the object and its surroundings. The content item can include images, video, and/or audio depicting the object and/or its surroundings (e.g., obtained using the camera/video subsystem 8920, microphones 830, environment sensor(s) 817, depth sensor(s) 814, etc.). Although a touching or pressing gesture is described above, in practice the user can assign any other gesture to these operations, depending on the implementation.

In the examples described above, the wearable multimedia device 101 can distinguish between the user positioning her right hand in the projection area and the user positioning her left hand in the projection area, and perform one or more operations based on which hand is positioned in the projection area. In some implementations, the wearable multimedia device 101 can further distinguish between the user positioning the front side of her hand (e.g., her palm) towards the wearable multimedia device 101 and the user positioning the back side of her hand towards the wearable multimedia device 101, and perform one or more operations based on which side of her hand is positioned towards the wearable multimedia device 101.

For example, if the user positions her left hand in the projection area, such that the front side of her left hand faces the wearable multimedia device 101, in response, the wearable multimedia device 101 can perform one or more first operations. Further, if the user positions her left hand in the projection area, such that the back side of her left hand faces the wearable multimedia device 101, in response, the wearable multimedia device 101 can perform one or more second operations. Further, if the user positions her right hand in the projection area, such that the front side of her right hand faces the wearable multimedia device 101, in response, the wearable multimedia device 101 can perform one or more third operations. Further, if the user positions her right hand in the projection area, such that the back side of her right hand faces the wearable multimedia device 101, in response, the wearable multimedia device 101 can perform one or more fourth operations.

Figure 15:
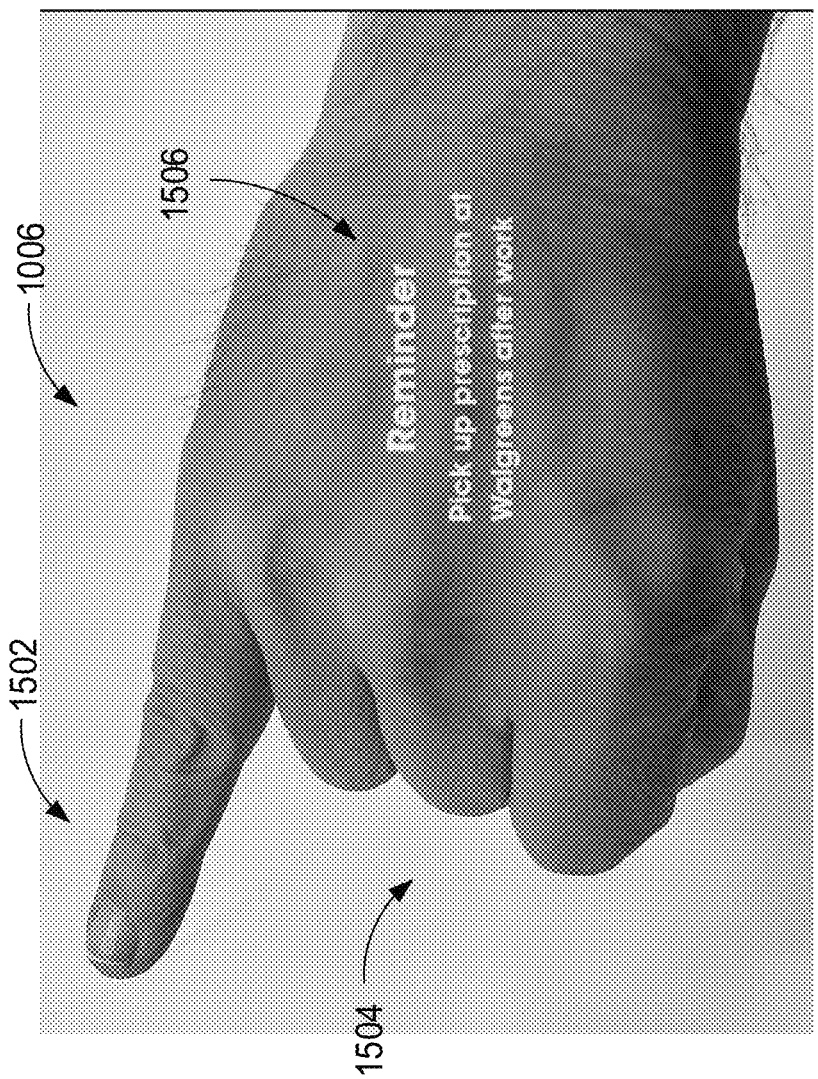
FIG. 15 is a diagram of further example hand-specific operations performed by a wearable multimedia device.

In some implementations, the wearable multimedia device 101 can further determine which of the fingers that the user is pointing outward and/or which of the fingers that the user is curling inward, and perform one or more operations based on the determination. As an example, as shown in FIG. 15, if the user positions her right hand 1006 in the projection area, such that the back side of her right hand 1006 faces the wearable multimedia device 101, her pinkie finger 1502 is pointed outward, and her other fingers 1504 are curled inward, in response, the wearable multimedia device 101 can perform one or more particular operations (e.g., executing a reminder application and presenting a VI 1506 for the reminder application on the back of the user's right hand 1006). Further, the wearable multimedia device 101 can perform other operations, depending on (i) the hand that is positioned within the projection area (e.g., left vs. right), (ii) the side of the hand that is positioned within the projection area (e.g., front vs. back), and/or (iii) the finger (or combination of fingers) that are pointed outwards and/or curled inward.

Further, although FIGS. 10-15 describe example operations that can be performed using a VI (e.g., a VI that is projected by a projector subsystem 832), in practice, similar operations also can be performed using other types of user interfaces. As an example, some or all of these operations can be performed using a user interface that is presented using a display device such as a computer monitor or a touch sensitive display panel.

Additional Example Processes

Figure 16:
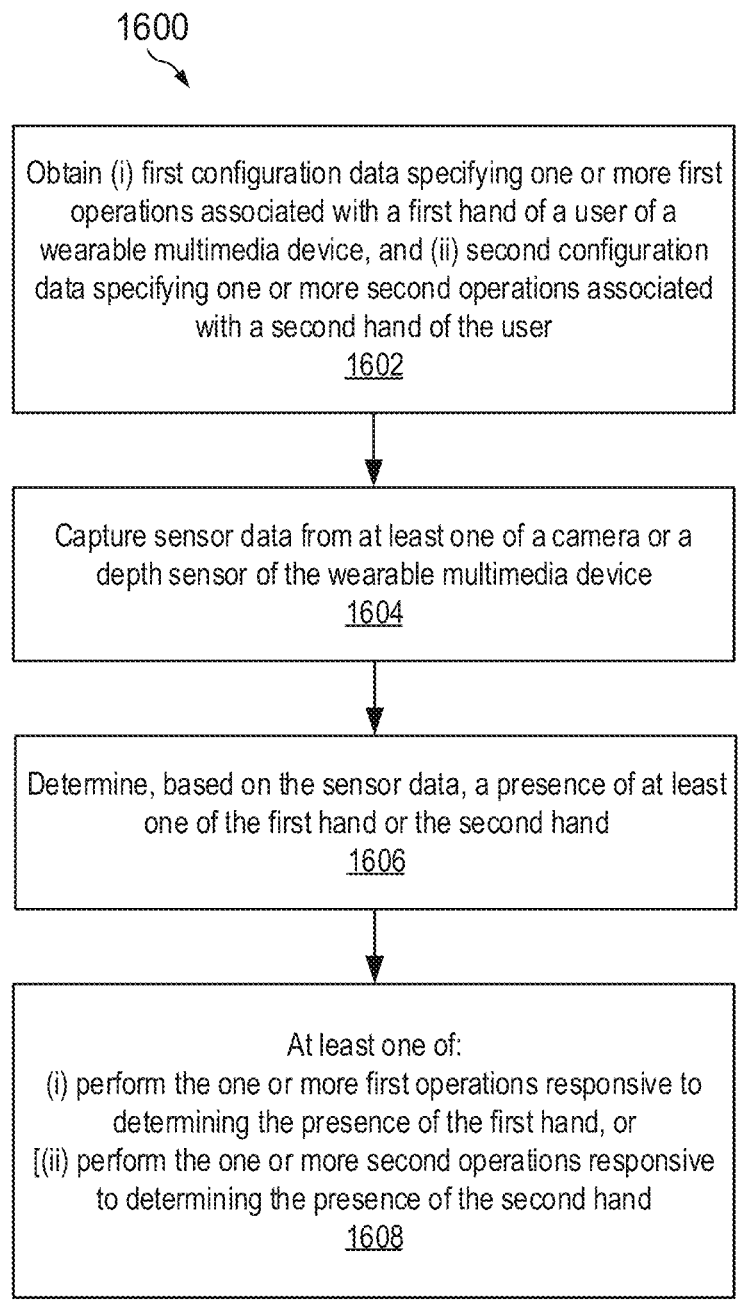
FIG. 16 is flow diagram of a process for performing operations using a wearable multimedia device, according to an embodiment.

FIG. 16 is flow diagram of an example process 1600 for performing operations using a wearable multimedia device, according to an embodiment. Process 1600 can be implemented using wearable multimedia devices 101 described in reference to FIGS. 1-9.

According to the process 1600, a wearable multimedia device obtains (i) first configuration data specifying one or more first operations associated with a first hand of a user of the wearable multimedia device, and (ii) second configuration data specifying one or more second operations associated with a second hand of the user (block 1602).

Further, the wearable multimedia device captures sensor data from at least one of a camera or a depth sensor of the wearable multimedia device (block 1604).

Further, the wearable multimedia device determines, based on the sensor data, a presence of at least one of the first hand or the second hand (block 1606). In some implementations, determining the presence of at least one of the first hand or the second hand can include determining that at least one of the first hand or the second hand is in a field of view of the camera and/or the depth sensor.

Further, the wearable multimedia device performs at least one of: (i) the one or more first operations responsive to determining the presence of the first hand, or (ii) the one or more second operations responsive to determining the presence of the second hand (block 1608).

In some implementations, the one or more first operations can include projecting, using a laser projector of the wearable multimedia device, a first virtual interface (VI) on a first surface. Further, the one or more second operations can include projecting, using the laser projector, a second VI on a second surface, where the first VI is different from the second VI.

In some implementations, the first surface can be a surface of the first hand. Further, the second surface can be a surface of the second hand. In some implementations, the first surface can be a palm of the first hand. Further, the second surface can be a palm of the second hand.

In some implementations, the one or more first operations can include execution of a first application. Further, the one or more second operations can include execution of a second application different from the first application. In some implementations, the first application is selected from a first set of applications. Further, the second application can be selected from a second set of applications different from the first set of applications.

In some implementations, the first configuration data can specify a first application associated with the first hand of the user. Further, performing at least some of the one or more first operations can include executing the first application.

In some implementations, the first application can be selected by the user prior to the user presenting at least one of the first hand or the second hand to the wearable multimedia device.

In some implementations, the second configuration data can specify a plurality of second applications associated with the second hand of the user. Further, performing at least some of the one or more second operations can include receiving an input from the user selecting a particular second application from the plurality of second applications, and executing the selected second application.

In some implementations, receiving the input from the user can include determining, based on the sensor data, a physical gesture performed by the user, and determining that the gesture is associated with the selected second application.

In some implementations, the one or more first operations can include execution of one of: a note taking application, a calendar application, a messaging application, or a map application Further, the one or more second operations can include execution of another one of: the note taking application, the calendar application, the messaging application, or the map application.

In some implementations, the wearable multimedia device can determine based on the sensor data, an orientation of at least one of the first hand or the second hand. For example, the wearable multimedia device can determine whether the front of the hand or a back of the hand is facing the wearable multimedia device. The wearable multimedia device can perform the one or more first operations further responsive to determining the orientation of the first hand. Further, the wearable multimedia device can perform the one or more second operations further responsive to determining the orientation of the second hand.

In some implementations, the wearable multimedia device can determine, based on the sensor data, that one or more fingers are pointing outward from at least one of the first hand or the second hand. For example, the wearable multimedia device can determine which of the user's finger are pointing outward and/or which of the user's finger are curled inward. The wearable multimedia device can perform the one or more first operations further responsive to determining that one or more fingers are pointing outward from the first hand. Further, the wearable multimedia device can perform the one or more second operations further responsive to determining that one or more fingers are pointing outward from the second hand.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
obtaining, by a wearable multimedia device:
first configuration data specifying one or more first operations associated with a first hand of a user of the wearable multimedia device, and
second configuration data specifying one or more second operations associated with a second hand of the user;
capturing, by the wearable multimedia device, sensor data from at least one of a camera or a depth sensor of the wearable multimedia device;
determining, by the wearable multimedia device, based on the sensor data, a presence of at least one of the first hand or the second hand; and
at least one of:
performing, by the wearable multimedia device, the one or more first operations responsive to determining the presence of the first hand, wherein the one or more first operations comprise projecting, using a laser projector of the wearable multimedia device, a first virtual interface (VI) of a first application on a first surface of the first hand, or
performing, by the wearable multimedia device, the one or more second operations responsive to determining the presence of the second hand, wherein the one or more second operations comprise projecting, using the laser projector, a second VI of a second application on a second surface of the second hand, wherein the first application is different from the second application.

2. The method of claim 1, wherein the first surface is a palm of the first hand, and wherein the second surface is a palm of the second hand.

3. The method of claim 1, wherein the one or more first operations comprise execution of the first application, and wherein the one or more second operations comprise execution of the second application.

4. The method of claim 3, wherein the first application is selected from a first set of applications, and wherein the second application is selected from a second set of applications different from the first set of applications.

5. The method of claim 1, wherein the first configuration data specifies that the first application is associated with the first hand of the user, and
wherein performing at least some of the one or more first operations comprises executing the first application.

6. The method of claim 5, wherein the first application is selected by the user prior to the user presenting at least one of the first hand or the second hand to the wearable multimedia device.

7. The method of claim 5, wherein the second configuration data specifies a plurality of applications associated with the second hand of the user, and
wherein performing at least some of the one or more second operations comprises:
receiving an input from the user selecting the second application from the plurality of applications, and
executing the second application.

8. The method of claim 7, wherein receiving the input from the user comprises:
determining, based on the sensor data, a physical gesture performed by the user; and
determining that the gesture is associated with the selected second application.

9. The method of claim 1, wherein determining the presence of at least one of the first hand or the second hand comprises:
determining that at least one of the first hand or the second hand is in a field of view of at least one of the camera or the depth sensor.

10. The method of claim 1, wherein the one or more first operations comprise execution of one of:
a note taking application,
a calendar application,
a messaging application, or
a map application.

11. The method of claim 10, wherein the one or more second operations comprise execution of another one of:
the note taking application,
the calendar application,
the messaging application, or
the map application.

12. The method of claim 1, further comprising:
determining, by the wearable multimedia device, based on the sensor data, an orientation of at least one of the first hand or the second hand, and
at least one of:
performing, by the wearable multimedia device, the one or more first operations further responsive to determining the orientation of the first hand, or
performing, by the wearable multimedia device, the one or more second operations further responsive to determining the orientation of the second hand.

13. The method of claim 1, further comprising:
determining, by the wearable multimedia device, based on the sensor data, that one or more fingers are pointing outward from at least one of the first hand or the second hand, and
at least one of:
performing, by the wearable multimedia device, the one or more first operations further responsive to determining that one or more fingers are pointing outward from the first hand, or
performing, by the wearable multimedia device, the one or more second operations further responsive to determining that one or more fingers are pointing outward from the second hand.

14. A wearable multimedia device, comprising:
at least one of a camera or a depth sensor;
a laser projector;
one or more processors; and
memory storing instructions that, when executed by the one or more processors, cause the one or more processors to perform operations comprising:
obtaining:
first configuration data specifying one or more first operations associated with a first hand of a user of the wearable multimedia device, and
second configuration data specifying one or more second operations associated with a second hand of the user;
capturing sensor data from at least one of the camera or the depth sensor;
determining, based on the sensor data, a presence of at least one of the first hand or the second hand; and
at least one of:
performing the one or more first operations responsive to determining the presence of the first hand, wherein the one or more first operations comprise projecting, using the laser projector, a first virtual interface (VI) of a first application on a first surface of the first hand, or
performing the one or more second operations responsive to determining the presence of the second hand, wherein the one or more second operations comprise projecting, using the laser projector, a second VI of a second application on a second surface of the second hand,
wherein the first application is different from the second application.

15. One or more non-transitory computer-readable media storing instructions that, when executed by at least one processor, cause the at least one processor to perform operations comprising:
obtaining, by a wearable multimedia device:
first configuration data specifying one or more first operations associated with a first hand of a user of the wearable multimedia device, and
second configuration data specifying one or more second operations associated with a second hand of the user;
capturing, by the wearable multimedia device, sensor data from at least one of a camera or a depth sensor of the wearable multimedia device;
determining, by the wearable multimedia device, based on the sensor data, a presence of at least one of the first hand or the second hand; and
at least one of:
performing, by the wearable multimedia device, the one or more first operations responsive to determining the presence of the first hand, wherein the one or more first operations comprise projecting, using a laser projector of the wearable multimedia device, a first virtual interface (VI) of a first application on a first surface of the first hand, or
performing, by the wearable multimedia device, the one or more second operations responsive to determining the presence of the second hand, wherein the one or more second operations comprise projecting, using the laser projector, a second VI of a second application on a second surface of the second hand,
wherein the first application is different from the second application.

\* \* \* \* \*